(12) United States Patent
Hara et al.

(10) Patent No.: US 8,049,131 B2
(45) Date of Patent: Nov. 1, 2011

(54) ULTRAHIGH STRENGTH WELDED JOINT AND ULTRAHIGH STRENGTH WELDED STEEL PIPE EXCELLENT IN COLD CRACKING RESISTANCE OF WELD METAL, AND METHODS FOR PRODUCING THE SAME

(75) Inventors: Takuya Hara, Futtsu (JP); Hitoshi Asahi, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 10/898,307

(22) Filed: Jul. 23, 2004

(65) Prior Publication Data
US 2005/0016980 A1 Jan. 27, 2005

(30) Foreign Application Priority Data
Jul. 25, 2003 (JP) ................. 2003-201846

(51) Int. Cl.
*B23K 9/18* (2006.01)
*B23K 25/00* (2006.01)
(52) U.S. Cl. ............... 219/73; 219/137 R; 219/137 WM
(58) Field of Classification Search ............ 219/73, 219/136, 137 R, 137 WM; 148/320, 325; 420/109
See application file for complete search history.

(56) References Cited

U.S. PATENT DOCUMENTS

| | | | | |
|---|---|---|---|---|
| 3,243,285 A * | 3/1966 | Fragetta et al. | ............. | 420/95 |
| 3,424,892 A * | 1/1969 | Wilcox | ............. | 219/137 R |
| 4,001,543 A * | 1/1977 | Bove et al. | ............. | 219/121.63 |
| 5,796,069 A * | 8/1998 | Jones et al. | ............. | 219/121.64 |
| 6,264,760 B1 | 7/2001 | Tamehiro et al. | | |
| 6,712,913 B2 * | 3/2004 | Hirata et al. | ............. | 148/325 |
| 6,953,508 B2 * | 10/2005 | Ikeda et al. | ............. | 148/320 |

(Continued)

FOREIGN PATENT DOCUMENTS
EP 0 448 791 A 10/1991
(Continued)

OTHER PUBLICATIONS

JP 2003 136130 A, published May 14, 2003, Patent Abstracts of Japan (abstract only).

(Continued)

*Primary Examiner* — M. Alexandra Elve
(74) *Attorney, Agent, or Firm* — Kenyon & Kenyon LLP

(57) ABSTRACT

The present invention, in a welded joint of steel sheets and a steel pipe body having a tensile strength of 800 MPa or more (over X100 in API Standards), provides: the welded joint of the steel sheets and the steel pipe produced by forming a steel sheet into a cylindrical shape and welding both the ends thereof, both excellent in cold cracking resistance; and methods for producing them. The present invention includes an ultrahigh strength welded joint and an ultrahigh strength welded steel pipe excellent in the cold cracking resistance of a weld metal, characterized in that the amount of non-diffusible hydrogen in the inner side weld metal is 0.01 ppm or more. It is preferable that the ratio of the non-diffusible hydrogen amount to the total hydrogen amount in said inner side weld metal is 0.5% or more. Further, it is preferable that Mo carbide is contained by not less than 1 piece/$\mu m^2$ in said inner side weld metal. The present invention also includes a method for producing said welded joint and welded steel pipe, characterized by welding the butted portion from the inner side and thereafter welding it from the outer side so that the reheating temperature of the inner side weld metal may reach within the range from 500° C. to 700° C.

2 Claims, 1 Drawing Sheet

U.S. PATENT DOCUMENTS

2002/0014478 A1 * 2/2002 Kim .................. 219/145.22

FOREIGN PATENT DOCUMENTS

| EP | 0 757 113 A | 2/1997 |
| EP | 0 867 520 A | 9/1998 |
| EP | 1 020 539 A | 7/2000 |
| JP | 05-000375 | 1/1993 |
| JP | 07-303991 A | 11/1995 |
| JP | 10-306348 A | 11/1998 |
| JP | 2001-1148 A | 1/2001 |
| JP | 2001-71176 A | 3/2001 |
| JP | 2001079667 | 3/2001 |
| JP | 2002115032 | 4/2002 |
| JP | 2002-309336 A | 10/2002 |
| JP | 2003-33876 A | 2/2003 |

OTHER PUBLICATIONS

JP 2002 115032 A, published Apr. 19, 2002, Patent Abstracts of Japan (abstract only).

I. Maroef et al. "Hydrogen Trapping in Ferritic Steel Weld Metal" International Materials Reviews, ASM International, Materials Park, US, vol. 47, No. 4, 2002, pp. 191-223, XP001145708.

JP 61 115694 A, published Jun. 3, 1986, Patent Abstracts of Japan (abstract only).

JP 58 163594 A, published Sep. 28, 1983, Patent Abstracts of Japan (abstract only).

JP 4 253595 A, published Sep. 9, 1992, Patent Abstracts of Japan (abstract only).

JP 9 314379 A, published Dec. 9, 1997, Patent Abstracts of Japan (abstract only).

JP 2002 059215 A, published Feb. 26, 2002, Patent Abstracts of Japan (abstract only).

JP 2002 346629, published Dec. 3, 2002, Patent Abstracts of Japan (abstract only).

Zhang Wenyue "Prediction of Prevention of Cold Cracking in Pipe-Line Steel Welding" China Welding, vol. 41, No. 2, Feb. 1995, pp. 25-33, XP009006428.

S. Prasad et al. "Significance of Hydrogen 1-10 Control in the Welding of Low Alloy Steels" Indian Welding Journal, Indian Institute of Welding, Calcutta, IN, vol. 16, No. 3, Jul. 1984, pp. 87-93, XP009006455.

Totsuka et al., "Relationship Between Hydrogen Trapping Effects of Precipitates and Hydrogen Embrittlement," Technical Research Laboratory, Kawasaki Steel Corp., pp. 113-116, Undated (w/ English language translation).

* cited by examiner

ULTRAHIGH STRENGTH WELDED JOINT AND ULTRAHIGH STRENGTH WELDED STEEL PIPE EXCELLENT IN COLD CRACKING RESISTANCE OF WELD METAL, AND METHODS FOR PRODUCING THE SAME

BACKGROUND OF THE INVENTION

1. Field of the Invention

The present invention relates to a high strength welded joint excellent in the cold cracking resistance of a weld metal and a high strength welded steel pipe excellent in the cold cracking resistance of a weld metal and suitable particularly for a line pipe.

2. Description of the Related Art

In recent years, as production technologies progress, it has become possible to produce high tensile strength steels of HT80 and HT100 classes by lowering the carbon equivalents thereof with the aim of improving weldability, particularly cold cracking susceptibility. In this light, a method for preventing cold cracking by lowering a carbon equivalent and applying high heat input welding capable of securing a higher efficiency than low heat input multi-layer welding which has so far been commonly adopted is disclosed in Japanese Unexamined Patent Publication No. H9-314379.

However, in the case of an ultrahigh strength steel pipe having a tensile strength of 900 MPa or more in particular, it has become difficult in accordance with higher strengthening of steel to prevent cold cracking of a weld metal susceptible to strength. To solve with the problem, a method for preventing cold cracking by lowering the strength of a weld metal and controlling the width of a weld zone in an appropriate range is disclosed in Japanese Unexamined Patent Publication No. 2001-1148. However, with such a method as to optimize the shape of a weld, not only restrictions on welding conditions increase but also the shapes of a groove and a product may possibly be limited.

Meanwhile, preheating treatment or postheating treatment is generally effective in preventing cold cracking of an ultrahigh strength weld metal. In this light, with regard to a high strength steel having a tensile strength of 750 MPa or more, a method that stipulates the conditions of preheating before welding and heat insulation after welding in order to secure a cooling time from after welding up to a temperature of 100° C. is disclosed in Japanese Unexamined Patent Publication No. 2003-33876. Further, methods for preventing cold cracking by changing the welding conditions of the primary and secondary layers are disclosed in Japanese Unexamined Patent Publication Nos. 2001-71176 and 2002-309336. However, the problems in the case of applying those methods to the production of actual structures and line pipes are that the application causes productivity to deteriorate and a production cost to increase.

An ultrahigh strength steel pipe whose strength and cold cracking resistance are improved by optimizing components and further increasing an oxygen amount without depending on such weld metal shapes and welding methods is disclosed in Japanese Unexamined Patent Publication No. H10-306348. Further, the development of a method for suppressing cold cracking caused by hydrogen trapping is promoted and, as an example thereof, a welding wire capable of preventing cold cracking by containing a specific amount of V in a weld metal and precipitating carbide is disclosed in Japanese Unexamined Patent Publication No. H7-303991. Furthermore, an ultrahigh strength steel pipe whose cold cracking resistance is improved by forming retained γ by 1% or more in an inner side weld metal is disclosed in Japanese Unexamined Patent Publication No. 2002-115032.

Nevertheless, the problem in a method of increasing an oxygen amount in a weld metal or a method of adding a large amount of V has been that the deterioration of low temperature toughness of the weld metal is hardly avoided. Another problem has been that a large amount of alloying elements such as Ni, etc. must be added in order to form retained γ of 1% or more and thus the production cost increases.

SUMMARY OF THE INVENTION

The present invention, in a welded joint of steel plates and a steel pipe body having a tensile strength of 800 MPa or more (over X100 in API Standards), provides: the welded joint and the steel pipe produced by forming a steel plate into a pipe shape and welding both the ends thereof, both excellent in the cold cracking resistance of a weld metal; and methods for producing them.

The present inventors have: intensively studied the conditions-that should be satisfied by a weld metal having a tensile strength of 800 MPa or more and excellent in cold cracking resistance; and invented a high strength welded joint and a high strength welded steel pipe excellent in cold cracking resistance and methods for producing them. The gist of the present invention is as follows;

(1) An ultrahigh strength welded joint excellent in the cold cracking resistance of a weld metal, said ultrahigh strength welded joint: being shaped into pipe and welding them from the inner side and thereafter from the outer side; and comprising a base material, an inner side weld metal and an outer side weld metal, characterized in that the amount of non-diffusible hydrogen in the inner side weld metal is 0.01 ppm or higher.

(2) An ultrahigh strength welded joint excellent in the cold cracking resistance of a weld metal according to the item (1), characterized in that the ratio of the non-diffusible hydrogen amount to the total hydrogen amount in said inner side weld metal is 0.5% or higher.

(3) A high strength welded joint excellent in the cold cracking resistance of a weld metal according to the item (1), characterized in that the inner side and outer side weld metals contain, in mass, C: 0.04 to 0.14%,
Si: 0.05 to 1.0%,
Mn: 1.2 to 2.2%,
P: 0.015% or less,
S: 0.010% or less,
Ni: 1.3 to 6.0%,
Mo: 0.5 to 2.0%,
Cr: 0.5 to 2.0%,
Nb: 0.001 to 0.1%,
V: 0.01 to 0.2%,
Ti: 0.003 to 0.05%,
Al: 0.02% or less, and
B: 0.005% or less,
with the balance consisting of Fe and unavoidable impurities.

(4) A high strength welded joint excellent in the cold cracking resistance of a weld metal according to the item (3), characterized in that Mo carbides is contained by not less than 1 piece/μm$^2$ in said inner side weld metal.

(5) A high strength welded joint excellent in the cold cracking resistance of a weld metal according to item (3), characterized in that the base material contains, in mass, C: 0.03 to 0.10%,
Si: 0.6% or less,
Mn: 1.7 to 2.5%, P: 0.015% or less,
S: 0.003% or less,
Ni: 0.1 to 1.0%,
Mo: 0.15 to 0.60%,
Nb: 0.001 to 0.10%, and
Ti: 0.005 to 0.030%,
and further one or more of
Cr: 0.8% or less,
V: 0.10% or less,
Al: 0.06% or less,
B: 0.005% or less,
N: 0.001 to 0.006%,
Cu: 1.0% or less,
Ca: 0.01% or less,
REM: 0.02% or less, and
Mg: 0.006% or less,
with the balance consisting of Fe and unavoidable impurities.

(6) An ultrahigh strength welded steel pipe excellent in the cold cracking resistance of a weld metal, characterized in that said steel pipe has a welded joint according to any one of the items (1) to (5).

(7) A method for producing a high strength welded joint excellent in the cold cracking resistance of a weld metal according to any one of the items (1) to (5), characterized by: shaping a steel plate into a pipe; welding said pipe from the inner side by using a welding wire containing, in mass,
C: 0.01 to 0.12%,
Si: 0.3% or less,
Mn: 1.2 to 2.4%,
Ni: 4.0 to 8.5%,
Mo: 0.5 to 3.0%,
Cr: 0.5 to 3.0%,
V: 0.01 to 0.5%,
Ti: 0.005 to 0.2%, and
Al: 0.02% or less,
with the balance consisting of Fe and unavoidable impurities; and thereafter welding said steel plate from the outer side by using said welding wire so that the reheating temperature of the inner side weld metal may reach within the range from 500° C. to 700° C.

(8) A method for producing a high strength welded steel pipe excellent in the cold cracking resistance of a weld metal according to the item (6), characterized by: shaping a steel plate into a pipe; welding both the ends of said steel sheet from the inner side by using a welding wire containing, in mass,
C: 0.01 to 0.12%,
Si: 0.3% or less,
Mn: 1.2 to 2.4%,
Ni: 4.0 to 8.5%,
Mo: 0.5 to 3.0%,
Cr: 0.5 to 3.0%,
V: 0.01 to 0.5%,
Ti: 0.005 to 0.2%, and
Al: 0.02% or less,
with the balance consisting of Fe and unavoidable impurities; and thereafter welding said ends of said steel plate from the outer side by using said welding wire so that the reheating temperature of the inner side weld metal may fall within the range from 500° C. to 700° C.

(9) A method for producing a high strength welded steel pipe excellent in the cold cracking resistance of a weld metal according to the item (8), characterized by applying: submerged arc welding by using a welding wire containing, in mass,
C: 0.01 to 0.12%,
Si: 0.3% or less,
Mn: 1.2 to 2.4%,
Ni: 4.0 to 8.5%,
Mo: 0.5 to 3.0%,
Cr: 0.5 to 3.0%,
V: 0.01 to 0.5%,
Ti: 0.005 to 0.2%, and
Al: 0.02% or less,
with the balance consisting of Fe and unavoidable impurities; and agglomerated-type or fused-type flux; and thereafter pipe expansion.

(10) A method for producing a high strength welded steel pipe excellent in the cold cracking resistance of a weld metal according to the item (8), characterized by shaping a steel plate into a pipe through a UO process which comprises the processes of, in sequence, C-forming, U-forming and O-forming.

DESCRIPTION OF THE PREFERRED EMBODIMENT

Figure 1:
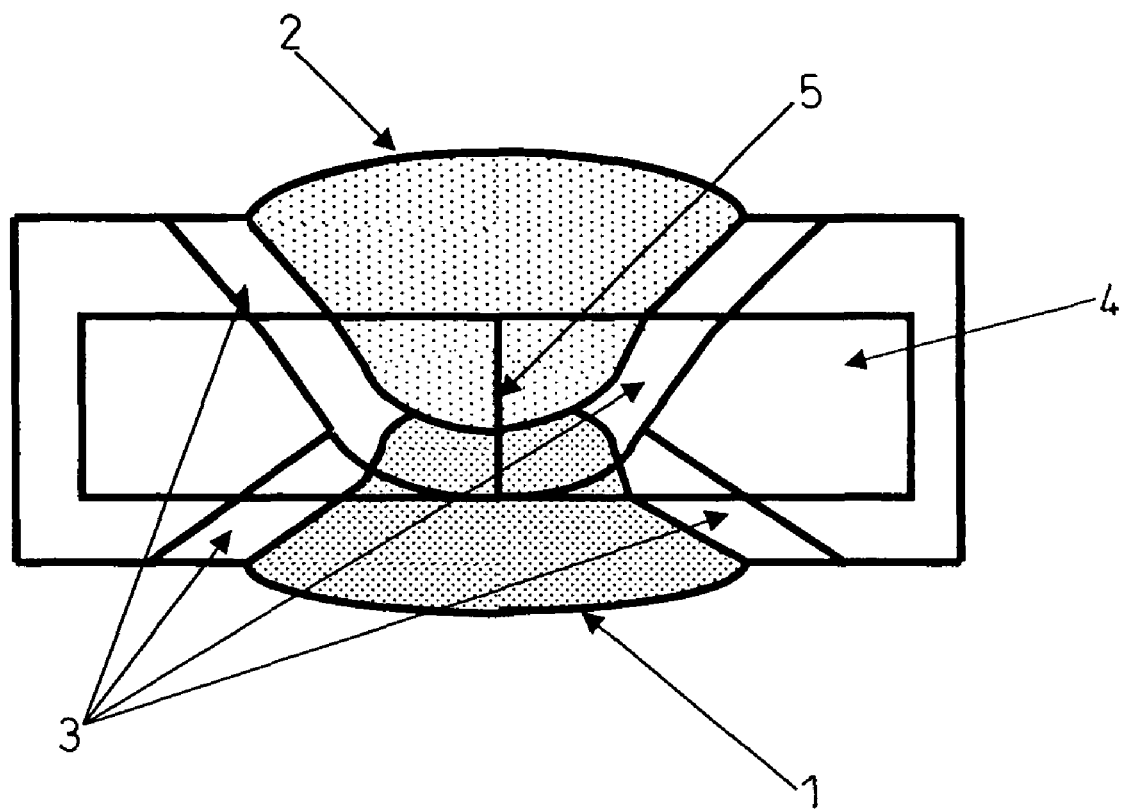
FIG. 1 is a schematic view of a section perpendicular to the welding direction of a steel plate, which shows the position where an impact test piece is sampled from a weld and a position where the test piece is notched.

In an ultrahigh strength welded joint formed by shaping a steel plate into pipe, welding the inner side thereof and thereafter welding the outer side thereof, cold cracking occurs at the inner side weld metal which is welded precedently. More specifically, cold cracking of an ultrahigh strength welded joint is reheating crack generated by reheating the inner side weld metal at the time of the welding of the outer side and is caused by diffusible hydrogen in the weld metal.

The present inventors, considering that the amount of hydrogen dissolving in a weld metal during welding was constant, oriented their thought toward a method for preventing cold cracking of a weld metal by accumulating hydrogen around precipitates and/or inclusions, thus increasing the amount of non-diffusible hydrogen, and reducing the amount of diffusible hydrogen. Here, as precipitates which trap hydrogen, carbides ($Mo_2C$, VC, TiC, NbC, etc.) and nitrides (VN, TiN, etc.) are instanced, and as inclusions which absorb hydrogen, sulfides (MnS, CaS, CuS, etc.) and oxides (TiO, $Y_2O_3$, etc.) are instanced.

It is estimated that if precipitates highly capable of trapping hydrogen, among those precipitates and inclusions, are utilized, the amount of precipitates can be suppressed and cold cracking can be avoided without the deterioration of low temperature toughness. In this light, the present inventors focused on precipitates formed when an inner side weld metal was reheated at the time of outer side welding and investigated the precipitates' capability to trap hydrogen in the inner side weld metal.

As a result, it was clarified that Mo carbides had the highest capability to trap hydrogen. This is presumably because the activation energy to discharge hydrogen is 50 kJ/mol in the case of Mo carbides, relatively higher than 35 kJ/mol in the case of V carbides which has so far been regarded effective in trapping hydrogen, and therefore the formation of Mo carbides makes it difficult to discharge hydrogen. In that sense, if Mo carbides is precipitated so that the amount thereof is smaller than the amount of V carbides in an inner side weld metal, it becomes possible to prevent cold cracking without the deterioration of low temperature toughness.

Further, the present inventors examined optimum welding conditions for precipitating Mo carbides in an inner side weld metal. As a result, it was clarified that it was extremely important to apply outer side welding so as to reheat an inner side weld metal to a temperature in the range from 500° C. to 700° C. This is because when an inner side weld metal is reheated to a temperature in the range from 500° C. to 700° C., fine Mo carbides conforming with the matrix is formed.

The present invention is hereunder explained in detail.

The present invention according to the items (1) to (5) is an ultrahigh strength welded joint which: is formed by shaping a steel plate into a pipe and welding them from the inner side and thereafter from the outer side; and comprises a base material, an inner side weld metal welded precedently and an outer side weld metal welded succeedingly. Further, the present invention according to the item (6) is a high strength welded steel pipe which: is produced by forming a steel plate into a pipe, welding both the ends of the steel plate from the inner side, and thereafter welding the ends of the steel plate from the outer side; and, like an ultrahigh strength welded joint, comprises a base material, an inner side weld metal welded precedently and an outer side weld metal welded succeedingly. That is, an inner side weld metal is reheated by the outer side welding and, in the case of a high strength welded joint or a high strength welded steel pipe which is produced by welding of three layers or more, the layer welded lastly is the outer side weld metal and all other layers welded before that and reheated belong to the inner side weld metal.

In a high strength welded joint according to the item (1) and a high strength welded steel pipe according to the item (6) of the present invention, the amount of non-diffusible hydrogen in an inner side weld metal welded precedently is controlled to 0.01 ppm or more. This is because, since the amount of hydrogen dissolving in a weld metal during welding is nearly constant, by increasing the amount of non-diffusible hydrogen to 0.01 ppm or more, it becomes possible to reduce the amount of diffusible hydrogen and thus to suppress the generation of cold cracking. The larger the non-diffusible hydrogen amount, the better, and therefore the upper limit thereof is not particularly regulated. However, a non-diffusible hydrogen amount cannot exceed a total hydrogen amount and the upper limit thereof is generally about 2 ppm.

In a high strength welded joint according to the item (2) and a high strength welded steel pipe according to the item (6) of the present invention, it is preferable that the ratio of the non-diffusible hydrogen amount to the total hydrogen amount in an inner side weld metal is 0.5% or more. This is because, by controlling the ratio of the non-diffusible hydrogen amount to the total hydrogen amount in a weld metal to 0.5% or more and thus making the diffusible hydrogen amount smaller than the non-diffusible hydrogen amount, it becomes possible to further suppress the generation of cold cracking in the weld metal. The higher the ratio of the non-diffusible hydrogen amount to the total hydrogen amount, the better, and therefore the upper limit thereof is not particularly regulated. However, a non-diffusible hydrogen amount cannot exceed a total hydrogen amount and the ratio is 100% at the highest.

Here, the total amount of hydrogen in an inner side weld metal is a value obtained by sampling a specimen from the inner side weld metal after welded from both the inner and outer sides and measuring the amount of hydrogen discharged during the temperature range from the room temperature to 400° C. by the gas chromatography and expressed in terms of ppm.

In contrast, the amount of non-diffusible hydrogen is defined as the amount of hydrogen remaining after a weld metal is left for 72 hours at 45° C. to discharge diffusible hydrogen. That is, the amount of non-diffusible hydrogen in an inner side weld metal is a value obtained by leaving a weld metal for 72 hours at 45° C. after welded from both the inner and outer sides, thereafter sampling a specimen from the inner side weld metal, and measuring the amount of hydrogen discharged during the temperature range from the room temperature to 400° C. by the gas chromatography and expressed in terms of ppm.

A diffusible hydrogen amount is obtained by subtracting a non-diffusible hydrogen amount from a total hydrogen amount measured as stated above. Now, the ratio of a non-diffusible hydrogen amount to a total hydrogen amount is a value obtained by dividing the non-diffusible hydrogen amount by the total hydrogen amount and expressed in terms of percentage.

In the measurement of a total hydrogen amount and a non-diffusible hydrogen amount, a test piece may be formed into, for example, a square bar 5 mm×5 mm×40 mm in size and it is necessary to machine the test piece while it is cooled by dry ice and to keep the machined test piece in dry ice or liquid nitrogen.

Next, the components of the weld metals of a high strength welded joint according to the item (3) and a high strength welded steel pipe according to the item (6) of the present invention are explained hereunder.

C is extremely effective in enhancing the strength of a weld metal of a steel and is an element that creates carbides. It is preferable to contain C by 0.04% or more in order to obtain an intended strength. In contrast, if a C content exceeds 0.14%, cold cracking tends to occur in an inner side weld metal and the maximum hardness of a weld heat-affected zone may sometimes increase at a portion where a weld, which is formed in the circumferential direction by joining an end of a steel pipe with an end of another steel pipe at the time of field laying, and a seam weld, which is formed in the longitudinal direction by joining both the ends of a steel plate at the time of pipe forming, intersect with each other, namely a T-cross portion. For that reason, it is desirable that the upper limit of a C content is 0.14% or less, more desirably 0.10% or less.

Si is effective in preventing cold cracking of a weld metal and is an element that forms retained austenite. Therefore, it is preferable to contain Si by 0.05% or more. In contrast, if an Si content exceeds 1.0%, in the case of multi-layer welding in particular, the low temperature toughness of a reheated inner side weld metal may sometimes deteriorate. For that reason, it is preferable that the upper limit of an Si content is 1.0% or less.

Mn is an element that improves the balance between the strength and low temperature toughness of a weld metal and also an element that is effective in forming retained austenite. In order to secure the effects, it is preferable to contain Mn by 1.2% or more. However, if an Mn content exceeds 2.2%, it sometimes happens that segregation is accelerated and low temperature toughness is deteriorated. Therefore, it is preferable that the upper limit of an Mn content is 2.2% or less.

P and S are impurities and it is desirable to control P and S contents to 0.015% or less and 0.010% or less respectively, in order to avoid the deterioration of the low temperature toughness of a weld metal and to lower the cold cracking susceptibility thereof. More desirable upper limits of P and S contents are 0.01% or less and 0.005% or less respectively. The lower limits of P and S contents are not stipulated and usual contents thereof are 0.001% or more and 0.0001% or more respectively.

Ni is an element that enhances the hardenability of a weld metal, improves the low temperature toughness thereof and forms retained austenite. It is preferable to contain Ni by 1.3% or more in order to secure intended strength and low temperature toughness and to prevent cold cracking. In contrast, if an Ni content exceeds 6.0%, there arises the danger of generating hot cracking in a weld metal. Therefore, it is preferable that the upper limit of an Ni content is 6.0% or less.

Mo is an element that enhances the hardenability of a weld metal, improves the low temperature toughness thereof and, in particular, forms Mo carbides in an inner side weld metal. If an Mo content is less than 0.5%, intended strength and low temperature toughness are hardly obtained and the precipitation of Mo carbides which is effective for the prevention of cold cracking is somewhat insufficient. On the other hand, if an Mo amount exceeds 2.0%, low temperature toughness may sometimes deteriorate. For those reasons, it is preferable that an Mo content is in the range from 0.5 to 2.0%.

Cr, Nb and V are elements having effects similar to Mo, and Cr carbides, Nb carbides and V carbides have the effect of trapping hydrogen though the effect is somewhat inferior to that of Mo carbides. If Cr, Nb and V contents are less than 0.5%, 0.001% and 0.01% respectively, the strength and low temperature toughness of a weld metal lower to some extent and also the effect of preventing cold cracking is somewhat insufficient. In contrast, if Cr, Nb and V contents exceed 2.0%, 0.1% and 0.2% respectively, the low temperature toughness of a weld metal may sometimes deteriorate. For those reasons, it is preferable that Cr, Nb and V contents are in the ranges from 0.5 to 2.0%, from 0.001 to 0.1% and from 0.01 to 0.2% respectively.

Ti is an element that is extremely effective in improving the low temperature toughness of a weld metal and, in order to obtain that effect, it is preferable that the lower limit of a Ti content is 0.003% or more. However, if a Ti content exceeds 0.05%, Ti carbides forms in quantity and deteriorates low temperature toughness in some cases. Therefore, it is preferable that the upper limit of a Ti content is 0.05% or less.

Al is an element that is effective as a deoxidizer and also has the effect of fractionizing the structure of a weld metal. For that reason, it is preferable that an Al content is 0.001% or more. In contrast, if an Al content exceeds 0.02%, it sometimes happens that Al-type nonmetallic inclusions increase and the cleanliness of a weld metal deteriorates. For that reason, it is preferable that the upper limit of an Al content is 0.02%.

B is an element that enhances hardenability even with a small amount and is effective for the improvement of the low temperature toughness of a weld metal. Therefore, it is preferable that a B content is 0.0001% or more. On the other hand, if a B content exceeds 0.005%, low temperature toughness may sometimes deteriorate. For that reason, it is preferable that the upper limit of a B content is 0.005% or less.

In some cases, Ca, REM, Mg and other elements may be contained in a weld metal as required in order to secure good refining and solidification during welding.

It is preferable that Ca, REM and Mg are added by 0.0001% or more in order to further improve strength and toughness and to make the production viable without losing the excellent features of the present invention. If Ca, REM and Mg are contained in excess of 0.005%, cleanliness may sometimes deteriorate. For that reason, it is preferable that Ca, REM and Mg contents are limited to 0.005% or less.

Next, the structures of a high strength welded joint according to the item (4) and a high strength welded steel pipe according to the item (6) of the present invention are explained hereunder.

In order to improve the cold cracking resistance of a weld metal, it is preferable that fine Mo carbides precipitates by at least 1 piece/$\mu m^2$ in the inner side weld metal. It is also preferable that the upper limit of the precipitation of Mo carbides is 100,000 pieces/$\mu m^2$ or less in consideration of low temperature toughness. In addition to Mo carbides, one or more of V carbides, Cr carbides, Ti carbides and Nb carbides may precipitate in an inner side weld metal. It is preferable that one or more of V carbides, Cr carbides, Ti carbides and Nb carbides precipitate by 1 piece/$\mu m^2$ or more in total in an inner side weld metal.

Mo carbides, V carbides, Cr carbides, Ti carbides and Nb carbides can be observed with a transmission electron microscope (hereunder referred to as a "TEM"). A specimen may be either a thin film or an extraction replica. The kinds of carbides can be distinguished from each other by the kinds of elements contained therein with an energy dispersive X-ray spectroscope (hereunder referred to as an "EDX") attached to a TEM. The precipitation amount of carbides may be expressed as an area ratio obtained by dividing the number of observed carbides by the area of the observed visual field by using a photograph of a structure taken with a TEM.

When Mo carbides is very fine or when Mo and C atoms concentrate without forming carbides and exist as clusters, it is difficult to observe the carbides with a TEM. In such a case, observation may be carried out by applying an overaging treatment and thus growing precipitates. A preferable condition of an overaging treatment is to retain a material for 10 min. at 700° C. As far as this condition is applied, Mo carbides exist as precipitates unless extremely fine Mo carbides or clusters of Mo and C exist.

Further, in order for a weld metal to have a tensile strength of 900 MPa or more, it is preferable that a bainite/martensite fraction in a microstructure is 50% or more. In a microstructure, the balance of bainite/martensite is ferrite and/or austenite.

When the balance of bainite/martensite contains ferrite, it is possible to distinguish bainite/martensite from ferrite with an optical microscope and to measure an ferrite fraction $\alpha_F$ (%) by applying image analysis to a photograph of a structure. Likewise, when the balance of bainite/martensite contains austenite, in particular when austenite exists as retained austenite, it is difficult to distinguish them with an optical microscope and therefore it is possible to measure an austenite fraction $\alpha_\gamma$ (%) by X-ray diffraction With regard to a bainite/martensite fraction, firstly an austenite fraction $\alpha_\gamma$ (%) is measured by X-ray diffraction, secondly a ferrite fraction $\alpha_F$ (%) is measured from an optical microscopic structure, and then a bainite/martensite fraction $\alpha_{BM}$ (%) can be determined from the austenite fraction $\alpha_\gamma$ (%) and the ferrite fraction $\alpha_F$ (%) by the following expression;

$$\alpha_{BM}(\%) = (100\% - \alpha_\gamma(\%)) \times (100\% - \alpha_F(\%))/100.$$

Next, the components in a steel sheet which is a base material for a high strength welded joint according to the item (5) and a high strength welded steel pipe according to the item (6) of the present invention are explained hereunder.

C is an element that is extremely effective in enhancing the strength of a steel, and it is preferable that C is contained by 0.03% or more. However, if a C content exceeds 0.10%, the low temperature toughness of a base material and a weld heat-affected zone (hereunder referred to as a "HAZ") somewhat deteriorates and on-site weldability is sometimes hindered. For that reason, it is desirable that the upper limit of a C content is 0.10% or less, more desirably 0.07% or less.

Si is an element that is effective for deoxidization and improves strength. However, if Si is added in excess of 0.6%, it sometimes happens that the low temperature toughness of a HAZ deteriorates to some extent and on-site weldability is hindered. For that reason, it is preferable that the upper limit of an Si content is 0.6% or less. Steel can be deoxidized also by Al and/or Ti and therefore it is all right even if the lower limit of an Si content is 0%. However, Si is usually contained by 0.01% or more as an impurity.

Mn is an element that is effective in causing the microstructure of a steel to be mainly composed of bainite/martensite and improving the balance between strength and low temperature toughness. Therefore, it is preferable that the lower limit of an Mn content is 1.7% or more. However, if Mn is contained in excess of 2.5%, it sometimes happens that the hardenability of a steel is enhanced, the low temperature toughness of a HAZ is deteriorated and also on-site weldability is impaired, and, in addition to those, center segregation in a continuously cast slab is accelerated and also the low temperature toughness of a base material is deteriorated in some cases. For those reasons, it is preferable that the upper limit of an Mn content is 2.5% or less.

P and S are impurity elements and, in order to further improve the low temperature toughness of a base material and a HAZ, it is preferable that the upper limits of P and S contents are 0.015% or less and 0.003% or less respectively. By decreasing a P amount, the center segregation of a continuously cast slab is mitigated, intergranular fracture is suppressed and low temperature toughness is improved. Further, by decreasing an S amount, the elongated MnS is formed in hot rolling is suppressed and ductility and toughness are improved. The lower the lower limits of P and S contents, the better, and therefore the lower limits thereof are not stipulated. However, P and S are usually contained by 0.001% or more and 0.0001% or more respectively.

Ni is an element that is effective in improving low temperature toughness without the deterioration of the on-site weldability of a low carbon steel. Ni is, compared with Mn, Cr and Mo, less likely to form a hardened structure that deteriorates low temperature toughness in a structure after rolling, particularly at a portion corresponding to a center segregation band of a continuously cast slab. Therefore, Ni is extremely effective in improving the low temperature toughness of a HAZ. The effect appears when an Ni content is 0.1% or more and therefore it is preferable that the lower limit of an Ni content is 0.1% or more and the effect is particularly conspicuous when the addition amount of Ni is 0.3% or more. However, if an Ni content exceeds 1%, it sometimes happens that a production cost increases, the low temperature toughness of a HAZ deteriorates to some extent and on-site weldability is impaired. For those reasons, it is preferable that the upper limit of an Ni content is 1.0%. Further, Ni is an element that is effective also in preventing Cu-cracking during continuous casting and hot rolling. Therefore, when Cu is contained, it is preferable that an Ni content is not less than one third of a Cu content.

Mo is an element that is effective in improving the hardenability of a steel and securing a microstructure mainly composed of bainite/martensite. The effect of Mo on improving hardenability becomes more increasingly by combined addition of Mo and B. In order to obtain the effect, it is preferable that an Mo content is 0.15% or more. In contrast, if Mo is contained in excess of 0.6%, it sometimes happens that the low temperature toughness of a HAZ and on-site weldability deteriorate. For that reason, the upper limit of an Mo content is set at 0.6%.

Nb is an element that enhances precipitation hardening and hardenability and by so doing increases the toughness of a steel. The effect of Nb on improving hardenability is multiplied by the coexistence with B. Further, when Nb and Mo coexist, the effect of suppressing the recrystallization of austenite during controlled rolling at hot rolling and fractionizing an austenite structure appears. In order to secure the effect, it is preferable that an Nb content is 0.001% or more. However, if an Nb content exceeds 0.10%, it sometimes happens that the low temperature toughness of a HAZ and on-site weldability are impaired. For that reason, it is preferable that the upper limit of an Nb content is 0.10%.

Ti is an element that forms fine TiN, suppresses the coarsening of austenite grains during the reheating of a slab and at a HAZ and fractionizes a microstructure, and improves the low temperature toughness of a base material and the HAZ. Ti also plays the role of fixing dissolved N, which is detrimental to the effect of B on improving hardenability, in the form of TiN. Further, when an Al amount is small, for example 0.005% or less, Ti exhibits the effects of forming oxides acting as transgranular transformation nuclei in a HAZ, fractionizing the microstructure of the HAZ, and improving low temperature toughness. In order to secure such effects of TiN, it is preferable that Ti is added by 0.005% or more. However, if a Ti content exceeds 0.030%, it sometimes happens that the coarsening of TiN and the precipitation hardening caused by TiC occur and low temperature toughness is deteriorated. For that reason, it is preferable that the upper limit of a Ti content is 0.030% or less. Additionally, when N is contained, it is preferable that the lower limit of a Ti content is $3.4 \times N$ or more.

Further, it is preferable that one or more of Cr, V, Al, B, N, Cu, Ca, REM and Mg are contained.

Cr is an element that increases strength and it is preferable that Cr is contained by 0.01% or more. In contrast, if Cr is contained in excess of 0.8%, it sometimes happens that the low temperature toughness of a HAZ deteriorates to some extent and on-site weldability is impaired. For that reason, it is preferable that the upper limit of a Cr content is 0.8% or less.

V has nearly the same effect as Nb but the effect of V is weaker than that of Nb. However, the effect of combined addition of Nb and V is extremely conspicuous in the case of an ultrahigh strength steel. It is preferable that the upper limit of a V content is 0.10% or less from the viewpoint of the low temperature toughness of a HAZ and on-site weldability. In particular, it is preferable that a V content is in the range from 0.03 to 0.08%.

Al is an element effective as a deoxidizer and has the effect on the fractionization of a structure. However, if an Al content exceeds 0.06%, it sometimes happens that Al-type nonmetallic inclusions increase and the cleanliness of steel is hindered. For that reason, the upper limit of an Al content is set at 0.06% or less. Now, Ti and/or Si have the function of deoxidization and therefore the addition of Al is not essential and the lower limit of an Al content may be 0%.

B dramatically increases the hardenability of a steel with the addition of a small amount and is an element that is very effective in securing a structure mainly compose of martensite/bainite. Further, the effect of B on the improvement of hardenability is more conspicuous by the coexistence with Mo and Nb. In order to obtain the effect, it is preferable that a B content is 0.0003% or more. In contrast, if B is added in excess of 0.005%, it sometimes happens that not only low temperature toughness is deteriorated but also the effect of increasing hardenability is impaired. For that reason, it is preferable that the upper limit of a B content is 0.005% or less.

N forms TiN, suppresses the coarsening of austenite grains during the reheating of a slab and at a HAZ, and improves the low temperature toughness of a base material and the HAZ. In order to secure the effect, it is preferable that the lower limit of an N content is 0.001% or more. However, if an N amount exceeds 0.006%, it sometimes happens that surface defects occur on a slab, the amount of dissolved N increases and the low temperature toughness of a HAZ deteriorates to some extent, and the effect of B on the improvement of hardenability is impaired. For those reasons, it is preferable that the upper limit of an N content is 0.006% or less.

Cu is an element that increases strength and it is preferable that Cu is contained by 0.01% or more. On the other hand, if Cu is contained in excess of 1.0%, it sometimes happens that the low temperature toughness of a HAZ deteriorates to some extent and on-site weldability is impaired. For that reason, it is preferable that the upper limit of a Cu content is 1.0% or less.

In order to control the shape of sulfides such as MnS and to improve low temperature toughness, it is preferable that Ca and REM are contained by 0.001% or more and 0.002% or more respectively. In contrast, if the contents of Ca and REM exceed 0.01% and 0.02% respectively, it sometimes happens that oxide and sulfide of Ca and REM, namely CaO, CaS and REM-CaS, are generated in quantity, form large clusters and large inclusions, and therefore not only deteriorate the cleanliness of a steel but also badly affect on-site weldability. For that reason, it is preferable that the upper limits of Ca and REM contents are 0.01% or less and 0.02% or less respectively.

Further, in the case of an ultrahigh strength line pipe, it is particularly effective to reduce the contents of S and O to 0.001% or less and 0.002% or less respectively and to control the value of ESSP, which is defined by the expression ESSP= (Ca)[1-124(O)]/1.25S, in the range from 0.5 to 10.0.

Mg is an element that forms finely dispersed oxide, suppresses the coarsening of prior austenite grains in a HAZ, and improves low temperature toughness. In order to obtain the effect, it is preferable that an Mg content is 0.001% or more. On the other hand, if an Mg content exceeds 0.006%, it sometimes happens that coarse oxides is formed and toughness is deteriorated. For that reason, it is preferable that the upper limit of an Mg content is 0.006% or less.

Further, in order to secure a good balance between strength and low temperature toughness, it is preferable to control the value of P in the range from 1.9 to 4.0, P being defined by the following expression;

$$P=2.7C+0.4Si+Mn+0.8Cr+0.45(Ni+Cu)+(1+\beta)Mo-1+\beta,$$

where, $\beta=1$ when B is 3 ppm or more and $\beta=0$ when B is less than 3 ppm. The reason is that, in order to obtain a strength of 900 MPa or more and an excellent low temperature toughness, it is preferable that the lower limit of a P value is 1.9 or more and in contrast, in order to improve the low temperature toughness of a HAZ and to secure on-site weldability, it is preferable that the upper limit of a P value is 4.0% or less.

In order to make a base material have a tensile strength of 900 MPa or more, it is preferable that the bainite/martensite fraction in a microstructure is 50% or more. In the microstructure of a base material too, similarly to the microstructure of a weld metal, the balance of bainite/martensite is composed of ferrite and/or austenite. Therefore, a bainite/martensite fraction in a base material, similarly to a bainite/martensite fraction in a weld metal, can be calculated from an austenite fraction obtained through X-ray diffraction and a ferrite fraction obtained by subjecting an optical microphotograph to image analysis.

Next, welding wires used for welding in the methods for producing a high strength welded joint according to the item (7) and a high strength welded steel pipe according to the item (8) of the present invention are explained hereunder.

A weld metal is produced by arc-welding a base material with a welding wire and, when submerged arc welding is employed, the dilution ratio of a base material is large and therefore, in order to obtain a weld metal having a desired composition, it is necessary to choose a welding wire in consideration of the dilution of the base material.

With regard to C, in order to secure a C content in the range required for a weld metal, it is preferable that a C content is in the range from 0.01 to 0.12% in consideration of the dilution of a base material and the contamination of C from an environment.

With regard to Si, Mn, Ni, Mo, Cr, V and Ti, in order to secure their contents in the ranges required for a weld metal, it is preferable that their contents are 0.3% or less, 1.2 to 2.4%, 4.0 to 8.5%, 0.5 to 3.0%, 0.5 to 3.0%, 0.01 to 0.5% and 0.005 to 0.2%, respectively, in consideration of the dilution by the components of a base material. The lower limit of an Si amount may be 0% and a preferable lower limit thereof is 0.05%.

Al is effective as a deoxidizer but it is preferable that an Al content is 0.02% or less in consideration of the cleanliness of a weld metal. The lower limit of an Al content may be 0% but it is preferable that Al is contained by 0.001% or more in order to secure its effect as a deoxidizer.

With regard to other elements, it is preferable that the contents of P and S are as low as possible and B may be added in order to secure strength. Further, Ti, Zr, Nb, Mg, etc. are added for the purpose of deoxidization in some cases.

Meanwhile, in the present invention, either agglomerated-type or fused-type flux can be used in submerged arc welding. Agglomerated-type flux has the advantages that alloying elements can be added therein and the amount of diffusible hydrogen is small but has the disadvantages that it is likely to be powderized and it is difficult to use it repeatedly. In contrast, fused-type flux has the advantages that it is in the state of glass powder, the strength of each particle is high and it hardly absorbs moisture but has the disadvantage that the amount of diffusible hydrogen is large. Flux may be selected in consideration of such features of each flux.

Next, a heating temperature of an inner side weld metal in the methods for producing a high strength welded joint according to the item (7) and a high strength welded steel pipe according to the item (8) of the present invention is explained hereunder.

A method for producing a high strength welded joint according to the item (7) of the present invention includes the processes of shaping a steel plate into a pipe and welding them from the inner side, and thereafter welding them from the outer side, and a method for producing a high strength welded steel pipe according to the item (8) of the present invention includes the processes of shaping into a pipe, butting both the ends thereof and welding them from the inner side, and thereafter welding them from the outer side. In the methods for producing a high strength welded joint according to the item (7) and a high strength welded steel pipe according to the item (8) of the present invention, it is extremely important to perform the outer side welding so that the reheating temperature of the inner side weld metal formed by the precedent welding may fall within the range from 500° C. to 700° C. This is because, if a reheating temperature of an inner side weld metal is lower than 500° C., the formation of fine Mo carbide conforming to the matrix is insufficient and, in contrast, if an inner side weld metal is reheated to a temperature exceeding 700° C., Mo carbide coarsens and the conformity with the matrix is impaired. As a result, the trap of hydrogen is insufficient and cold cracking tends to occur.

A preferable range of welding condition varies to some extent in accordance with the thickness of a steel sheet; for example, when a thickness is 16 mm, a preferable heat input from the inner and outer sides is in the range from 2.0 to 3.2 kJ/mm and, when a thickness is 20 mm, a preferable heat input from the inner and outer sides is in the range from 2.5 to 4.0 kJ/mm.

Here, with regard to welding, not only single electrode but also plural electrodes can be used for the welding. When plural electrodes are used for welding, the combination of various kinds of wires can be adopted. In this case, it is not necessary that the components of every wire are in the ranges specified above and it is acceptable as far as the average composition calculated from the components of each wire and the consumption thereof is in the ranges specified above.

A method for producing a high strength welded steel pipe according to the item (9) of the present invention includes the process of producing a steel pipe from a steel sheet having the components according to the item (5). In the present invention, a method for producing a steel plate includes the processes of melting steel, casting it and hot rolling it in accordance with the usual method. In hot rolling, it is preferable to employ controlled rolling wherein a heating temperature, a rolling temperature and a cooling rate after hot rolling are limited in the ranges from 950° C. to 1,250° C., from 700° C. to 1,100° C. and from 5 to 60° C./sec., respectively. After hot rolling, heat treatment such as quenching, tempering and the like may be applied.

A method for producing a high strength welded steel pipe according to the item (10) of the present invention includes the processes of, after producing a steel plate, forming a pipe at a UO process wherein the steel plate is formed into a U-shape and then an O-shape, and welding the butted portion by submerged arc welding. After the pipe forming, it is preferable to improve roundness by applying pipe expansion. Next, the examples of the present invention are explained hereunder.

Example 1

Steels having the chemical components shown in Tables 1 and 2 (continued from Table 1) were melted and refined in a 300-ton-converter and thereafter processed through continuous casting to produce slabs, the slabs were subjected to rough rolling at a heating temperature of 1,100° C. and to finish rolling while the cumulative reduction ratio in the temperature range from 800° C. to 900° C. was controlled to about 80%, and resultantly steel plates were produced. The tensile strength of each steel plate was measured by a tensile test conforming to JIS Z2241 and the Charpy absorbed energy thereof at −20° C. was measured by a Charpy test conforming to JIS Z2242, and the results, together with the plate thickness, are shown in Table 3. Here, the results of the Charpy absorbed energy are shown in the column expressed by $vE_{-20}$.

Further, a bainite/martensite fraction in a microstructure of a steel plate was measured in the following way. Firstly, a test piece was sampled from the center portion of the thickness of a steel plate and an austenite fraction $\alpha_\gamma$ (%) was measured by the X-ray diffraction method. Secondly, the center portion of the plate thickness was observed with an optical microscope, a photograph of a structure was taken, and a ferrite fraction $\alpha_F$ (%) was measured by subjecting the photograph of the structure to image analysis. A bainite/martensite fraction $\alpha_{BM}$ (%) was determined from the measured austenite fraction $\alpha_\gamma$ (%) and ferrite fraction $\alpha_F$ (%) according to the following expression;

$$\alpha_{BM}(\%)=(100\%-\alpha_\gamma(\%))\times(100\%-\alpha_F(\%))/100.$$

As shown in Table 3, in the cases of Steel Nos. 1 to 14 and 17 to 20 which are the base materials of welded joints according to the item (5) of the present invention, the strength and low temperature toughness are good. On the other hand, in the cases of Steel Nos. 15 and 16, the respective contents of C and Mo in the steel plates are smaller than those of the base materials of the welded joints stipulated in the item (5) of the present invention and thus the strength is somewhat low. In the cases of Steel Nos. 21 and 22, the respective contents of C and Mo in the steel plates are larger than those of the base materials of the welded joints stipulated in the item (5) of the present invention and thus the low temperature toughness deteriorates to some extent.

Beveling was applied to the edges of each of those steel sheets and the edges were butted, and then submerged arc welding was applied from the inner side at the heat input of 1.8 J/mm by using welding wires shown in Table 4. After the inner side welding, a thermocouple was attached on the surface of the inner side weld metal at the plate thickness center side, another welding was applied from the outer side under the same conditions as the inner side welding, and the maximum arrival temperature, namely the reheating temperature, of the inner side weld metal was measured. The reheating temperatures of the inner side weld metals are shown in Table 4.

A specimen was sampled from the plate thickness center portion of each of the weld metals and was subjected to chemical analysis, and the results are shown in Tables 5 and 6 (continued from Table 5). Further, a small piece including the welded portion was sampled from each of the steel pipes and a specimen 5 mm×5 mm×40 mm in size for hydrogen analysis was sampled by cutting the small piece while the inner side weld metal was cooled with dry ice. The specimen for hydrogen analysis was cooled with dry ice or liquid nitrogen during the time from after the sampling to the measurement of the total hydrogen amount. The total hydrogen amount was regarded as the sum of the amount of hydrogen discharged when a test piece was heated from the room temperature to 600° C. and was measured by gas chromatography. Further, a small piece including the welded portion was sampled from each of the steel pipes and retained for 72 hours at 45° C., thereafter a specimen for hydrogen analysis was sampled in the same way as the case of the analysis of the total hydrogen amount, the hydrogen amount was measured by gas chromatography, and the measured amount was regarded as the non-diffusible hydrogen amount. The ratio of a non-diffusible hydrogen amount to a total hydrogen amount was a value obtained by dividing the non-diffusible hydrogen amount by the total hydrogen amount and was expressed in terms of percentage.

A #A2 tensile test piece was sampled from each of the outer side weld metals and subjected to a tensile test in conformity with JIS Z3111. Further in conformity with JIS Z3111, as shown in FIG. 1, produced was a test piece which, on a cross section perpendicular to the welding direction of a welded joint, had the direction, which is perpendicular to the welding direction of the weld and the sheet thickness direction, as its longitudinal direction and had a 2 mm V notch at the center of the portion where the inner side and outer side weld metals met with each other. Then the test piece was subjected to an impact test at −20° C. and the Charpy absorbed energy was measured. Furthermore, with regard to cold cracking, after inner side and outer side welding, the weld was subjected to ultrasonic inspection in conformity with JIS Z3060 and to X-ray test in conformity with JIS Z3104, and the occurrence of cold cracking was observed.

Further, a small piece was sampled from each of the inner side weld metals, heated for 10 minutes at 700° C. and observed with a TEM. Then a photograph of the structure of the small piece was taken and the precipitation of Mo carbides was determined in terms of area percentage by dividing the number of the observed Mo carbides by the area of the observed visual field. The kinds of carbides were distinguished by using an EDX. Further, the bainite/martensite fraction $\alpha_{BM}$ (%) of an inner side weld metal was determined in the same way as the bainite/martensite fraction of a steel plate.

Further, non-diffusible hydrogen amounts, the ratios of non-diffusible hydrogen amounts to the total hydrogen amounts, tensile strengths of weld metals, Charpy absorbed energies at −20° C., the evaluation of cold cracking and sheet thicknesses are shown in Table 7. As shown in Table 7, in the cases of Weld Metal Nos. 1 to 14 which are the examples according to the items (1) to (5) of the present invention, the low temperature toughness is good and cold cracking does not occur even when the weld metal strength is 900 MPa or more.

On the other hand, in the cases of Weld Metal Nos. 15 and 16, the respective contents of C and Mo in the weld metals are somewhat smaller than those stipulated in the item (3) of the present invention and, in the cases of Weld Metal Nos. 17 to 20, the heating temperature of the inner side at the time when the outer side is welded is outside the range stipulated in the item (7) of the present invention. In any of those cases, the amount of formed Mo carbides is somewhat small, the non-diffusible hydrogen amount is smaller than that stipulated in the present invention, and resultantly cold cracking occurs. In the cases of Weld Metal Nos. 21 and 22, the respective contents of C and Mo are somewhat larger than those stipulated in the item (3) of the present invention and thus the strength is 1,150 MPa or more and the low temperature toughness deteriorates to some extent.

TABLE 1

| Steel No. | Chemical component (mass %) | | | | | | | | | | |
|---|---|---|---|---|---|---|---|---|---|---|---|
| | C | Si | Mn | P | S | Ni | Mo | Nb | Ti | Cr | V |
| 1 | 0.04 | 0.10 | 1.95 | 0.005 | 0.0005 | 0.5 | 0.30 | 0.030 | 0.012 | 0.30 | 0.060 |
| 2 | 0.08 | 0.13 | 1.81 | 0.008 | 0.0006 | 0.4 | 0.45 | 0.040 | 0.005 | 0.60 | 0.060 |
| 3 | 0.04 | 0.08 | 1.90 | 0.003 | 0.0008 | 0.3 | 0.45 | 0.030 | 0.012 | 0.30 | 0.040 |
| 4 | 0.07 | 0.07 | 2.12 | 0.004 | 0.0003 | 0.8 | 0.40 | 0.060 | 0.016 | 0.30 | 0.050 |
| 5 | 0.06 | 0.25 | 1.85 | 0.009 | 0.0006 | 0.3 | 0.30 | 0.012 | 0.012 | 0.30 | 0.060 |
| 6 | 0.08 | 0.10 | 1.85 | 0.010 | 0.0004 | 0.4 | 0.45 | 0.026 | 0.012 | 0.60 | 0 |
| 7 | 0.06 | 0.02 | 1.80 | 0.003 | 0.0006 | 0.3 | 0.50 | 0.030 | 0.013 | 0.30 | 0.060 |
| 8 | 0.09 | 0.15 | 1.70 | 0.007 | 0.0005 | 0.5 | 0.30 | 0.050 | 0.008 | 0.30 | 0.100 |
| 9 | 0.07 | 0.17 | 1.90 | 0.005 | 0.0002 | 0.2 | 0.35 | 0.030 | 0.010 | 0.30 | 0.050 |
| 10 | 0.05 | 0.20 | 2.20 | 0.008 | 0.0004 | 0.3 | 0.40 | 0.050 | 0.025 | 0.60 | 0.070 |
| 11 | 0.07 | 0.22 | 1.85 | 0.002 | 0.0003 | 0.3 | 0.20 | 0.090 | 0.024 | 0.20 | 0.060 |
| 12 | 0.05 | 0.25 | 2.12 | 0.004 | 0.0006 | 0.4 | 0.40 | 0.030 | 0.012 | 0.50 | 0.060 |
| 13 | 0.05 | 0.31 | 1.86 | 0.006 | 0.0008 | 0.5 | 0.40 | 0.010 | 0.024 | 0.40 | 0.090 |
| 14 | 0.06 | 0.09 | 2.12 | 0.006 | 0.0006 | 0.4 | 0.45 | 0.040 | 0.013 | 0.60 | 0 |
| 15 | <u>0.02</u> | 0.28 | 2.00 | 0.004 | 0.0004 | 0.5 | 0.30 | 0.012 | 0.012 | 0.25 | 0 |
| 16 | 0.06 | 0.32 | 2.00 | 0.003 | 0.0006 | 0.8 | <u>0</u> | 0.030 | 0.008 | 0.70 | 0 |
| 17 | 0.06 | 0.20 | 1.81 | 0.002 | 0.0006 | 0.6 | 0.30 | 0.020 | 0.010 | 0.30 | 0 |
| 18 | 0.06 | 0.24 | 2.25 | 0.004 | 0.0006 | 0.5 | 0.50 | 0.070 | 0.005 | 0 | 0 |
| 19 | 0.06 | 0.10 | 2.30 | 0.010 | 0.0003 | 0.4 | 0.40 | 0.013 | 0.021 | 0.30 | 0 |
| 20 | 0.03 | 0.48 | 2.20 | 0.003 | 0.0005 | 0.8 | 0.20 | 0.024 | 0.012 | 0.60 | 0.050 |
| 21 | <u>0.25</u> | 0.31 | 1.80 | 0.002 | 0.0008 | 0.3 | 0.30 | 0.060 | 0.017 | 0 | 0.050 |
| 22 | 0.08 | 0.31 | 1.96 | 0.004 | 0.0025 | 1.0 | <u>2.0</u> | 0.060 | 0.018 | 0.80 | 0 |

A figure "0" in the table means that the content of the relevant component is smaller than the detectable limit.
An underlined figure means that the content of the relevant component in the base material is outside the range stipulated in the item (5) or (6) of the present invention.
$C_{eq} = C + Mn/6 + (Ni + Cu)/15 + (Cr + Mo + V)/5$
$P_{cm} = C + Si/30 + (Mn + Cr + Cu)/20 + Ni/60 + Mo/15 + V/5 + 5B$
C, Si, Mn, Cr, Cu, Ni, Mo, V and B represent the respective contents (mass %) thereof.
$C_{eq}$ and $P_{cm}$ are calculated on the premise that the contents of Cu and elements under detectable limits are zero.

TABLE 2

(continued from Table 1)

| Steel No. | Chemical component (mass %) | | | | | | | | |
|---|---|---|---|---|---|---|---|---|---|
| | Al | B | N | Cu | Ca | REM | Mg | $C_{eq}$ | $P_{cm}$ |
| 1 | 0.0040 | 0.0010 | 0.0023 | 0 | 0.002 | 0 | 0 | 0.525 | 0.190 |
| 2 | 0.0030 | 0 | 0.0015 | 0.50 | 0.0012 | 0 | 0 | 0.664 | 0.273 |
| 3 | 0.0084 | 0.0050 | 0.0030 | 0.30 | 0 | 0.0008 | 0.0023 | 0.555 | 0.232 |
| 4 | 0.0005 | 0 | 0.0025 | 0.30 | 0 | 0 | 0 | 0.647 | 0.253 |
| 5 | 0.0071 | 0.0020 | 0.0040 | 0.30 | 0 | 0 | 0.0015 | 0.540 | 0.232 |
| 6 | 0.0061 | 0 | 0.0030 | 0.35 | 0.0021 | 0.0035 | 0.0030 | 0.640 | 0.254 |
| 7 | 0.0053 | 0.0015 | 0.0025 | 0.45 | 0.0011 | 0 | 0.0038 | 0.582 | 0.240 |
| 8 | 0.0026 | 0 | 0.0035 | 0.30 | 0.0022 | 0 | 0 | 0.567 | 0.248 |
| 9 | 0.0134 | 0.0008 | 0.0024 | 0 | 0 | 0 | 0 | 0.540 | 0.221 |
| 10 | 0.0042 | 0 | 0.0016 | 0.30 | 0.0024 | 0 | 0.0018 | 0.671 | 0.250 |
| 11 | 0.0041 | 0.0026 | 0.0035 | 0 | 0 | 0.0042 | 0.0042 | 0.490 | 0.217 |

TABLE 2-continued (continued from Table 1)

| Steel No. | Chemical component (mass %) | | | | | | | | |
|---|---|---|---|---|---|---|---|---|---|
| | Al | B | N | Cu | Ca | REM | Mg | $C_{eq}$ | $P_{cm}$ |
| 12 | 0.0051 | 0 | 0.0025 | 0 | 0 | 0 | 0 | 0.622 | 0.229 |
| 13 | 0.0042 | 0.0025 | 0.0026 | 0.30 | 0 | 0 | 0.0041 | 0.591 | 0.245 |
| 14 | 0.0008 | 0 | 0.0034 | 0.30 | 0.0035 | 0.0023 | 0 | 0.667 | 0.250 |
| 15 | 0.0061 | 0.0010 | 0.0045 | 0.30 | 0 | 0 | 0.0029 | 0.517 | 0.190 |
| 16 | 0.0058 | 0 | 0.0026 | 0.40 | 0 | 0.0007 | 0 | 0.613 | 0.239 |
| 17 | 0.0032 | 0.0019 | 0.0020 | 0 | 0 | 0 | 0.0026 | 0.522 | 0.212 |
| 18 | 0.0029 | 0 | 0.0035 | 0.30 | 0.0011 | 0 | 0.0018 | 0.588 | 0.237 |
| 19 | 0.0063 | 0.0045 | 0.0036 | 0 | 0.0006 | 0.0006 | 0 | 0.610 | 0.249 |
| 20 | 0.0221 | 0 | 0.0025 | 1.00 | 0.0017 | 0.0015 | 0 | 0.687 | 0.268 |
| 21 | 0.0032 | 0.0026 | 0.0040 | 0.05 | 0 | 0 | 0 | 0.643 | 0.396 |
| 22 | 0.0180 | 0 | 0.0016 | 0 | 0.0021 | 0 | 0 | 1.033 | 0.378 |

A figure "0" in the table means that the content of the relevant component is smaller than the detectable limit.
An underlined figure means that the content of the relevant component in the base material is outside the range stipulated in the item (5) or (6) of the present invention.
$C_{eq} = C + Mn/6 + (Ni + Cu)/15 + (Cr + Mo + V)/5$
$P_{cm} = C + Si/30 + (Mn + Cr + Cu)/20 + Ni/60 + Mo/15 + V/5 + 5B$
C, Si, Mn, Cr, Cu, Ni, Mo, V and B represent the respective contents (mass %) thereof.
$C_{eq}$ and $P_{cm}$ are calculated on the premise that the contents of Cu and elements under detectable limits are zero.

TABLE 3

| Steel No. | β | P | TS MPa | $vE_{-20}$ J | $\alpha_{BM}$ % | Plate thickness mm |
|---|---|---|---|---|---|---|
| 1 | 1 | 3.15 | 990 | 280 | 98 | 17 |
| 2 | 0 | 2.41 | 1,020 | 210 | 97 | 14 |
| 3 | 1 | 3.45 | 1,050 | 290 | 96 | 13 |
| 4 | 0 | 2.47 | 980 | 220 | 98 | 16 |
| 5 | 1 | 3.22 | 1,053 | 220 | 98 | 13 |
| 6 | 0 | 2.34 | 970 | 200 | 99 | 19 |
| 7 | 1 | 3.55 | 930 | 200 | 95 | 20 |
| 8 | 0 | 1.90 | 980 | 210 | 94 | 15 |
| 9 | 1 | 3.19 | 1,010 | 230 | 96 | 16 |
| 10 | 0 | 2.57 | 1,023 | 200 | 97 | 15 |
| 11 | 1 | 2.82 | 1,066 | 210 | 99 | 13 |
| 12 | 0 | 2.34 | 1,052 | 230 | 98 | 13 |
| 13 | 1 | 3.60 | 1,042 | 240 | 98 | 14 |
| 14 | 0 | 2.54 | 995 | 260 | 97 | 18 |
| <u>15</u> | 1 | 3.33 | 880 | 220 | 96 | 18 |
| <u>16</u> | 0 | 2.39 | 870 | 240 | 95 | 13 |
| 17 | 1 | 3.16 | 1,100 | 200 | 93 | 20 |
| 18 | 0 | 2.37 | 1,156 | 210 | 96 | 15 |
| 19 | 1 | 3.72 | 1,024 | 200 | 94 | 20 |
| 20 | 0 | 2.96 | 1,014 | 240 | 96 | 20 |
| <u>21</u> | 1 | 3.36 | 1,223 | 150 | 98 | 16 |
| <u>22</u> | 0 | 4.39 | 1,165 | 170 | 99 | 18 |

An underlined figure means that the content of the relevant component in the base material is outside the range stipulated in the item (5) or (6) of the present invention.
β = 1 when B is 3 ppm or more, and β = 0 when B is less than 3 ppm.
$P = 2.7C + 0.4Si + Mn + 0.8Cr + 0.45(Ni + Cu) + (1 + β)Mo − 1 + β$
C, Si, Mn, Cr, Cu, Ni and Mo represent the respective contents (mass %) thereof.
Calculation was performed on the premise that the contents of elements under detectable limits are zero.

TABLE 4

| Production No. | Wire No. | Chemical component of welding wire (mass %) | | | | | | | | | | Reheating temperature of inner side weld metal (° C.) |
|---|---|---|---|---|---|---|---|---|---|---|---|---|
| | | C | Si | Mn | Ni | Mo | Cr | V | Ti | Al | Cr + Mo + V | |
| 1 | 1 | 0.045 | 0.20 | 1.62 | 4.40 | 1.70 | 2.00 | 0.20 | 0.067 | 0.013 | 3.9 | 500 |
| 2 | 2 | 0.034 | 0.15 | 1.42 | 4.30 | 2.70 | 1.20 | 0.16 | 0.060 | 0.027 | 4.1 | 525 |
| 3 | 3 | 0.09 | 0.03 | 1.39 | 4.20 | 2.10 | 1.50 | 0.14 | 0.083 | 0.017 | 3.7 | 550 |
| 4 | 4 | 0.06 | 0 | 1.69 | 4.40 | 1.50 | 2.00 | 0.30 | 0.087 | 0.013 | 3.8 | 575 |
| 5 | 5 | 0.05 | 0.30 | 1.51 | 4.20 | 1.50 | 2.20 | 0.08 | 0.070 | 0.020 | 3.8 | 600 |
| 6 | 6 | 0.12 | 0.05 | 1.24 | 4.45 | 2.00 | 1.60 | 0.16 | 0.087 | 0.010 | 3.8 | 625 |
| 7 | 7 | 0.035 | 0.01 | 2.14 | 4.30 | 1.00 | 2.50 | 0.01 | 0.070 | 0.017 | 3.5 | 650 |
| 8 | 8 | 0.07 | 0.10 | 1.79 | 4.30 | 2.00 | 1.80 | 0.18 | 0.087 | 0.003 | 4.0 | 675 |
| 9 | 9 | 0.06 | 0.12 | 1.64 | 4.40 | 2.10 | 1.60 | 0.15 | 0.100 | 0.010 | 3.9 | 700 |
| 10 | 10 | 0.12 | 0.25 | 2.09 | 4.35 | 1.40 | 2.10 | 0.50 | 0.117 | 0.020 | 3.0 | 520 |
| 11 | 11 | 0.03 | 0.17 | 1.39 | 4.25 | 3.00 | 1.20 | 0.16 | 0.080 | 0.003 | 4.4 | 570 |
| 12 | 12 | 0.04 | 0.20 | 1.55 | 4.45 | 3.00 | 0.90 | 0.19 | 0.013 | 0.017 | 4.1 | 530 |
| 13 | 13 | 0.05 | 0.26 | 1.42 | 4.45 | 1.20 | 3.00 | 0.09 | 0.150 | 0.020 | 4.3 | 680 |
| 14 | 14 | 0.05 | 0.15 | 1.55 | 4.13 | 1.30 | 2.50 | 0.05 | 0.083 | 0.020 | 3.9 | 550 |
| 15 | <u>15</u> | <u>0.005</u> | 0.23 | 1.41 | 4.36 | 2.10 | 1.50 | 0.40 | 0.087 | 0.010 | 4.3 | 600 |
| 16 | <u>16</u> | 0.02 | 0.27 | 1.44 | 4.45 | <u>0.01</u> | 2.80 | 0.03 | 0.077 | 0.007 | 2.7 | 620 |
| 17 | 17 | 0.01 | 0.30 | 1.80 | 4.45 | 1.00 | 1.50 | 0.08 | 0.050 | 0.017 | 3.1 | <u>200</u> |
| 18 | 18 | 0.02 | 0.19 | 1.79 | 4.35 | 2.00 | 1.50 | 0.18 | 0.067 | 0.020 | 4.0 | <u>750</u> |
| 19 | 19 | 0.05 | 0.01 | 2.19 | 4.12 | 0.87 | 2.30 | 0.78 | 0.083 | 0.010 | 4.0 | <u>300</u> |
| 20 | 20 | 0.09 | 0.10 | 1.44 | 4.10 | 2.00 | 1.40 | 0.07 | 0.117 | 0.010 | 3.5 | <u>800</u> |

TABLE 4-continued

| Production No. | Wire No. | Chemical component of welding wire (mass %) | | | | | | | | | | Reheating temperature of inner side weld metal (° C.) |
|---|---|---|---|---|---|---|---|---|---|---|---|---|
| | | C | Si | Mn | Ni | Mo | Cr | V | Ti | Al | Cr + Mo + V | |
| 21 | 21 | 0.20 | 0.13 | 2.19 | 4.20 | 2.10 | 1.00 | 0.46 | 0.053 | 0.015 | 3.6 | 620 |
| 22 | 22 | 0.12 | 0.10 | 1.74 | 8.50 | 5.00 | 1.30 | 0.12 | 0.060 | 0.017 | 5.9 | 600 |

A figure "0" in the table means that the content of the relevant component is smaller than the detectable limit.
An underlined figure means that the figure is outside the range stipulated in the item (7) of the present invention.

TABLE 5

| Production No. | Weld metal No. | Steel No. | Wire No. | Chemical component of weld metal (mass %) | | | | | | | |
|---|---|---|---|---|---|---|---|---|---|---|---|
| | | | | C | Si | Mn | P | S | Ni | Mo | Cr |
| 1 | 1 | 1 | 1 | 0.045 | 0.23 | 1.53 | 0.004 | 0.0007 | 2.00 | 1.26 | 1.20 |
| 2 | 2 | 2 | 2 | 0.050 | 0.18 | 1.62 | 0.009 | 0.0008 | 2.15 | 1.45 | 1.10 |
| 3 | 3 | 3 | 3 | 0.09 | 0.15 | 1.52 | 0.004 | 0.001 | 2.00 | 1.10 | 1.05 |
| 4 | 4 | 4 | 4 | 0.06 | 0.08 | 1.68 | 0.006 | 0.0005 | 2.30 | 1.25 | 1.00 |
| 5 | 5 | 5 | 5 | 0.05 | 0.30 | 1.46 | 0.010 | 0.0008 | 2.20 | 1.23 | 1.12 |
| 6 | 6 | 6 | 6 | 0.13 | 0.15 | 1.35 | 0.008 | 0.0006 | 2.45 | 1.11 | 1.05 |
| 7 | 7 | 7 | 7 | 0.053 | 0.11 | 2.05 | 0.004 | 0.0008 | 2.20 | 1.00 | 1.20 |
| 8 | 8 | 8 | 8 | 0.07 | 0.20 | 1.95 | 0.009 | 0.0007 | 2.00 | 1.45 | 1.25 |
| 9 | 9 | 9 | 9 | 0.05 | 0.23 | 1.75 | 0.007 | 0.0005 | 2.10 | 1.45 | 1.15 |
| 10 | 10 | 10 | 10 | 0.10 | 0.25 | 2.00 | 0.005 | 0.0008 | 2.25 | 1.90 | 0.80 |
| 11 | 11 | 11 | 11 | 0.05 | 0.22 | 1.53 | 0.006 | 0.0005 | 2.00 | 1.54 | 1.45 |
| 12 | 12 | 12 | 12 | 0.08 | 0.26 | 1.62 | 0.008 | 0.0009 | 2.15 | 1.35 | 1.45 |
| 13 | 13 | 13 | 13 | 0.10 | 0.29 | 1.35 | 0.008 | 0.0008 | 2.00 | 1.35 | 1.55 |
| 14 | 14 | 14 | 14 | 0.09 | 0.26 | 1.62 | 0.007 | 0.0007 | 1.95 | 1.22 | 1.35 |
| 15 | 15 | 15 | 15 | 0.015 | 0.28 | 1.45 | 0.009 | 0.0008 | 1.90 | 1.75 | 1.25 |
| 16 | 16 | 16 | 16 | 0.07 | 0.35 | 1.65 | 0.004 | 0.0007 | 2.45 | 0.05 | 1.35 |
| 17 | 17 | 17 | 17 | 0.06 | 0.90 | 1.52 | 0.005 | 0.0008 | 1.80 | 1.65 | 0.50 |
| 18 | 18 | 18 | 18 | 0.04 | 0.36 | 1.45 | 0.004 | 0.0007 | 2.25 | 1.45 | 1.25 |
| 19 | 19 | 19 | 19 | 0.05 | 0.23 | 2.10 | 0.007 | 0.0005 | 2.30 | 1.35 | 1.55 |
| 20 | 20 | 20 | 20 | 0.13 | 0.27 | 1.65 | 0.005 | 0.0007 | 2.15 | 1.00 | 1.10 |
| 21 | 21 | 21 | 21 | 0.25 | 0.20 | 2.00 | 0.007 | 0.001 | 2.25 | 1.25 | 1.26 |
| 22 | 22 | 22 | 22 | 0.14 | 0.18 | 1.65 | 0.009 | 0.0005 | 2.40 | 3.00 | 0.85 |

A figure "0" in the table means that the content of the relevant component is smaller than the detectable limit.
An underlined figure means that the figure is outside the range stipulated in the item (3) of the present invention.
$C_{eq} = C + Mn/6 + (Ni + Cu)/15 + (Cr + Mo + V)/5$
$P_{cm} = C + Si/30 + (Mn + Cr + Cu)/20 + Ni/60 + Mo/15 + V/5 + 5B$
C, Si, Mn, Cr, Cu, Ni, Mo, V and B represent the respective contents (mass %) thereof.
$C_{eq}$ and $P_{cm}$ are calculated on the premise that the contents of Cu and elements under detectable limits are zero.

TABLE 6

(continued from Table 5)

| Production No. | Weld metal No. | Steel No. | Wire No. | Chemical component of weld metal (mass %) | | | | | | | |
|---|---|---|---|---|---|---|---|---|---|---|---|
| | | | | Nb | V | Ti | Al | B | Cr + Mo + V | $C_{eq}$ | $P_{cm}$ |
| 1 | 1 | 1 | 1 | 0.010 | 0.04 | 0.021 | 0.015 | 0 | 2.50 | 0.933 | 0.311 |
| 2 | 2 | 2 | 2 | 0.006 | 0.05 | 0.019 | 0.018 | 0.0005 | 2.60 | 0.983 | 0.332 |
| 3 | 3 | 3 | 3 | 0.012 | 0.06 | 0.023 | 0.015 | 0.0005 | 2.21 | 0.918 | 0.338 |
| 4 | 4 | 4 | 4 | 0.020 | 0.05 | 0.020 | 0.014 | 0.0003 | 2.30 | 0.952 | 0.324 |
| 5 | 5 | 5 | 5 | 0.030 | 0.07 | 0.025 | 0.005 | 0.0009 | 2.42 | 0.923 | 0.319 |
| 6 | 6 | 6 | 6 | 0.020 | 0.05 | 0.024 | 0.005 | 0.0005 | 2.21 | 0.959 | 0.377 |
| 7 | 7 | 7 | 7 | 0.010 | 0.06 | 0.023 | 0.005 | 0.0010 | 2.26 | 0.992 | 0.333 |
| 8 | 8 | 8 | 8 | 0.015 | 0.04 | 0.024 | 0.011 | 0.0008 | 2.74 | 1.075 | 0.374 |
| 9 | 9 | 9 | 9 | 0.007 | 0.06 | 0.025 | 0.013 | 0 | 2.66 | 1.013 | 0.340 |
| 10 | 10 | 10 | 10 | 0.003 | 0.06 | 0.035 | 0.015 | 0 | 2.76 | 1.134 | 0.418 |
| 11 | 11 | 11 | 11 | 0.010 | 0.07 | 0.014 | 0.005 | 0.0016 | 3.06 | 1.049 | 0.357 |
| 12 | 12 | 12 | 12 | 0.015 | 0.05 | 0.003 | 0.015 | 0 | 2.85 | 1.062 | 0.373 |
| 13 | 13 | 13 | 13 | 0.012 | 0.06 | 0.045 | 0.016 | 0.0015 | 2.96 | 1.049 | 0.391 |
| 14 | 14 | 14 | 14 | 0.013 | 0.02 | 0.020 | 0.017 | 0.0050 | 2.59 | 1.008 | 0.388 |

TABLE 6-continued (continued from Table 5)

| Production No. | Weld metal No. | Steel No. | Wire No. | Chemical component of weld metal (mass %) | | | | | | | |
|---|---|---|---|---|---|---|---|---|---|---|---|
| | | | | Nb | V | Ti | Al | B | Cr + Mo + V | $C_{eq}$ | $P_{cm}$ |
| <u>15</u> | 15 | <u>15</u> | <u>15</u> | 0.020 | 0.03 | 0.023 | 0.013 | 0.0009 | 3.03 | 0.989 | 0.315 |
| <u>16</u> | 16 | <u>16</u> | <u>16</u> | 0.017 | 0.04 | 0.013 | 0.012 | 0.0008 | 1.44 | 0.796 | 0.284 |
| <u>17</u> | 17 | 17 | 17 | 0.003 | 0.05 | 0.025 | 0.015 | 0.0019 | 2.20 | 0.872 | 0.345 |
| <u>18</u> | 18 | 18 | 18 | 0.012 | 0.01 | 0.025 | 0.016 | 0.0005 | 2.71 | 0.974 | 0.325 |
| <u>19</u> | 19 | 19 | 19 | 0.015 | 0.03 | 0.015 | 0.013 | 0.0008 | 2.93 | 1.139 | 0.376 |
| <u>20</u> | 20 | 20 | 20 | 0.020 | 0.05 | 0.030 | 0.015 | 0.0008 | 2.15 | 0.977 | 0.388 |
| <u>21</u> | 21 | <u>21</u> | <u>21</u> | 0.013 | 0.04 | 0.017 | 0.015 | 0.0024 | 2.55 | 1.243 | 0.557 |
| <u>22</u> | 22 | <u>22</u> | <u>22</u> | 0.006 | 0.04 | 0.019 | 0.020 | 0.0008 | 3.89 | 1.352 | 0.519 |

A figure "0" in the table means that the content of the relevant component is smaller than the detectable limit.
An underlined figure means that the figure is outside the range stipulated in the item (3) of the present invention.
$C_{eq}$ = C + Mn/6 + (Ni + Cu)/15 + (Cr + Mo + V)/5
$P_{cm}$ = C + Si/30 + (Mn + Cr + Cu)/20 + Ni/60 + Mo/15 + V/5 + 5B
C, Si, Mn, Cr, Cu, Ni, Mo, V and B represent the respective contents (mass %) thereof.
$C_{eq}$ and $P_{cm}$ are calculated on the premise that the contents of Cu and elements under detectable limits are zero.

TABLE 7

| | | | | | Hydrogen amount and precipitate analysis result in inner side weld metal | | | | | | | |
|---|---|---|---|---|---|---|---|---|---|---|---|---|
| Prod. No. | Steel No. | Weld metal No. | β | P | Non-diffusible hydrogen amount ppm | Total hydrogen amount ppm | Ratio of non-diffusible hydrogen amount to total hydrogen amount (%) | Mo carbides pieces/μm² | TS MPa | $vE_{-20}$ J | $α_{BM}$ % | Cold cracking |
| 1 | 1 | 1 | 0 | 3.86 | 0.5 | 3.0 | 16.7 | 3.0 | 1,006 | 93 | 94 | None |
| 2 | 2 | 2 | 1 | 2.41 | 0.3 | 8.0 | 3.8 | 1.0 | 1,007 | 110 | 95 | None |
| 3 | 3 | 3 | 1 | 3.45 | 0.4 | 6.0 | 6.7 | 5.0 | 996 | 121 | 93 | None |
| 4 | 4 | 4 | 1 | 2.47 | 0.5 | 5.0 | 10 | 10.0 | 968 | 111 | 92 | None |
| 5 | 5 | 5 | 1 | 3.22 | 0.3 | 7.0 | 4.3 | 7.0 | 1,010 | 100 | 91 | None |
| 6 | 6 | 6 | 1 | 2.34 | 0.2 | 5.0 | 4.0 | 5.0 | 1,000 | 97 | 97 | None |
| 7 | 7 | 7 | 1 | 3.55 | 0.1 | 10.0 | 1.0 | 10.0 | 995 | 115 | 94 | None |
| 8 | 8 | 8 | 1 | 1.90 | 0.3 | 6.0 | 5.0 | 6.0 | 1,000 | 121 | 96 | None |
| 9 | 9 | 9 | 0 | 3.19 | 0.2 | 5.0 | 4.0 | 20.0 | 1,043 | 95 | 95 | None |
| 10 | 10 | 10 | 0 | 2.57 | 0.2 | 4.0 | 5.0 | 2.0 | 956 | 125 | 93 | None |
| 11 | 11 | 11 | 1 | 2.82 | 0.3 | 8.0 | 3.8 | 5.0 | 1,075 | 100 | 91 | None |
| 12 | 12 | 12 | 0 | 2.34 | 0.4 | 3.0 | 13.3 | 4.0 | 1,042 | 115 | 98 | None |
| 13 | 13 | 13 | 1 | 3.60 | 0.2 | 5.0 | 4.0 | 10.0 | 1,052 | 95 | 99 | None |
| 14 | 14 | 14 | 1 | 2.54 | 0.5 | 5.0 | 10 | 3.0 | 956 | 146 | 95 | None |
| <u>15</u> | <u>15</u> | 15 | 1 | 3.33 | <u>0</u> | 3.0 | <u>0</u> | <u>0.1</u> | 922 | 170 | 92 | Present |
| <u>16</u> | <u>16</u> | 16 | 1 | 2.39 | <u>0</u> | 4.0 | <u>0</u> | <u>0.1</u> | 916 | 156 | 96 | Present |
| <u>17</u> | 17 | 17 | 1 | 3.16 | <u>0</u> | 2.0 | <u>0</u> | <u>0.3</u> | 946 | 155 | 94 | Present |
| <u>18</u> | 18 | 18 | 1 | 2.37 | <u>0</u> | 3.0 | <u>0</u> | <u>0.2</u> | 970 | 120 | 95 | Present |
| <u>19</u> | 19 | 19 | 1 | 3.72 | <u>0</u> | 3.0 | <u>0</u> | <u>0.1</u> | 956 | 146 | 97 | Present |
| <u>20</u> | 20 | 20 | 1 | 2.96 | <u>0</u> | 4.0 | <u>0</u> | <u>0.3</u> | 980 | 135 | 96 | Present |
| <u>21</u> | <u>21</u> | 21 | 1 | 3.36 | 0.3 | 5.0 | 6.0 | 5.3 | 1,223 | 36 | 95 | None |
| <u>22</u> | <u>22</u> | 22 | 1 | 4.39 | 0.4 | 4.0 | 10 | 8.0 | 1,178 | 27 | 96 | None |

An underlined figure means that the figure is outside the relevant range stipulated in any one of the items (1) to (5) of the present invention.
β = 1 when B is 3 ppm or more, and β = 0 when B is less than 3 ppm.
P = 2.7C + 0.4Si + Mn + 0.8Cr + 0.45(Ni + Cu) + (1 + β)Mo − 1 + β
C, Si, Mn, Cr, Cu, Ni and Mo represent the respective contents (mass %) thereof.
Calculation was performed on the premise that the contents of Cu and elements under detectable limits are zero.

Example 2

Steels containing the components shown in Tables 1 and 2 (continued from Table 1) were melted and refined in the same way as Example 1 and hot rolled to produce steel plates 16 mm in thickness. The tensile strengths, Charpy absorbed energies at −20° C., bainite/martensite fractions, which were measured in the same way as Example 1, were nearly the same as those in Table 3. Those steel plates were formed into tubular shape through a UO process, tackwelded, thereafter welded from the inner side with three electrodes under the conditions shown in Table 8 by using the welding wires containing the components shown in Table 4 and flux, and subsequently welded from the outer side. The reheating temperature of an inner side weld metal was measured in the same way as Example 1. After the welding was applied, the steel pipes were expanded by 1% and the welds were subjected to X-ray test and ultrasonic inspection in conformity with JIS Z3050, and thus the existence of cold cracking was examined. The reheating temperatures of the inner side weld metals are shown in Table 8.

A specimen was sampled from each of the weld metals and the chemical compositions thereof were analyzed. The results are shown in Tables 9 and 10 (continued from Table 9). Further, the measurements of the total hydrogen amount, non-diffusible hydrogen amount and carbide precipitate amount in each of the inner side weld metals, tensile test and Charpy impact test of each of the weld metals, and the examination of the existence of cold cracking were performed in the same way as Example 1. The results are shown in Table 11. As shown in Table 11, in the cases of Weld Metal Nos. 23 to 36 according to the item (6) of the present invention, the low temperature toughness is good, the strengths of the weld metals are 900 MPa or more, and cold cracking does not occur.

On the other hand, in the cases of Weld Metal Nos. 37 and 38, the respective contents of C and Mo in the weld metals are somewhat smaller than those stipulated in the item (6) of the present invention and, in the cases of Weld Metal Nos. 39 to 42, the heating temperatures of the inner side when welding is applied from the outer side are outside the range stipulated in the item (8) of the present invention, the amount of formed Mo carbides is somewhat small, the non-diffusible hydrogen amount is smaller than that stipulated in the present invention, and therefore cold cracking appears. In the cases of Weld Metal Nos. 43 and 44, the respective contents of C and Mo in the weld metals are somewhat larger than those stipulated in the item (6) of the present invention, the strengths are 1,150 MPa or more, and the low temperature toughness deteriorates to some extent.

TABLE 8

| Production No. | Steel No. | Wire No. | Outer side heat input kJ/mm | Welding speed m/min. | Reheating temperature of inner side weld metal (° C.) |
|---|---|---|---|---|---|
| 23 | 1 | 1 | 2.6 | 1.5 | 580 |
| 24 | 2 | 2 | 2.4 | 2.0 | 620 |
| 25 | 3 | 3 | 2.4 | 2.3 | 580 |
| 26 | 4 | 4 | 3.0 | 1.8 | 600 |
| 27 | 5 | 5 | 3.2 | 1.2 | 620 |
| 28 | 6 | 6 | 2.6 | 2.5 | 570 |
| 29 | 7 | 7 | 3.5 | 2.0 | 630 |
| 30 | 8 | 8 | 2.4 | 1.7 | 600 |
| 31 | 9 | 9 | 2.6 | 1.6 | 650 |
| 32 | 10 | 10 | 2.4 | 1.5 | 580 |
| 33 | 11 | 11 | 2.2 | 1.2 | 590 |
| 34 | 12 | 12 | 2.4 | 1.7 | 620 |
| 35 | 13 | 13 | 2.8 | 1.6 | 580 |
| 36 | 14 | 14 | 3.0 | 1.8 | 610 |
| 37 | <u>15</u> | <u>15</u> | 2.6 | 2.0 | 580 |
| 38 | <u>16</u> | <u>16</u> | 2.6 | 2.2 | 590 |
| 39 | 17 | 17 | 2.8 | 2.5 | <u>200</u> |
| 40 | 18 | 18 | 1.8 | 2.4 | <u>800</u> |
| 41 | 19 | 19 | 1.8 | 3.0 | <u>300</u> |
| 42 | 20 | 20 | 3.5 | 1.8 | <u>750</u> |
| 43 | <u>21</u> | <u>21</u> | 2.7 | 1.5 | 590 |
| 44 | <u>22</u> | <u>22</u> | 2.9 | 1.7 | 610 |

An underlined figure in the table means that the figure is outside the range stipulated in the item (8) of the present invention.

TABLE 9

| Production No. | Weld metal No. | Steel No. | Wire No. | Chemical component of weld metal (mass %) | | | | | | | |
|---|---|---|---|---|---|---|---|---|---|---|---|
| | | | | C | Si | Mn | P | S | Ni | Mo | Cr |
| 23 | 23 | 1 | 1 | 0.055 | 0.25 | 1.63 | 0.005 | 0.0005 | 2.40 | 1.36 | 1.00 |
| 24 | 24 | 2 | 2 | 0.044 | 0.20 | 1.43 | 0.008 | 0.0006 | 2.30 | 1.50 | 1.00 |
| 25 | 25 | 3 | 3 | 0.10 | 0.08 | 1.40 | 0.003 | 0.0008 | 2.20 | 1.20 | 1.00 |
| 26 | 26 | 4 | 4 | 0.07 | 0.05 | 1.70 | 0.004 | 0.0003 | 2.40 | 1.23 | 1.02 |
| 27 | 27 | 5 | 5 | 0.06 | 0.35 | 1.52 | 0.009 | 0.0006 | 2.20 | 1.32 | 0.90 |
| 28 | 28 | 6 | 6 | 0.14 | 0.10 | 1.25 | 0.005 | 0.0004 | 2.45 | 1.11 | 1.11 |
| 29 | 29 | 7 | 7 | 0.045 | 0.15 | 2.15 | 0.003 | 0.0006 | 2.30 | 0.95 | 1.00 |
| 30 | 30 | 8 | 8 | 0.08 | 0.15 | 1.80 | 0.007 | 0.0005 | 1.90 | 1.50 | 0.95 |
| 31 | 31 | 9 | 9 | 0.07 | 0.17 | 1.65 | 0.005 | 0.0002 | 2.40 | 1.45 | 0.85 |
| 32 | 32 | 10 | 10 | 0.13 | 0.30 | 2.10 | 0.008 | 0.0004 | 2.35 | 0.80 | 0.60 |
| 33 | 33 | 11 | 11 | 0.04 | 0.22 | 1.40 | 0.002 | 0.0003 | 2.25 | 1.50 | 1.30 |
| 34 | 34 | 12 | 12 | 0.05 | 0.25 | 1.56 | 0.004 | 0.0006 | 2.45 | 1.23 | 1.30 |
| 35 | 35 | 13 | 13 | 0.06 | 0.31 | 1.43 | 0.006 | 0.0008 | 2.45 | 1.24 | 1.50 |
| 36 | 36 | 14 | 14 | 0.06 | 0.20 | 1.56 | 0.006 | 0.0006 | 2.13 | 1.12 | 1.23 |
| 37 | <u>37</u> | <u>15</u> | 15 | <u>0.025</u> | 0.28 | 1.42 | 0.004 | 0.0004 | 2.36 | 1.50 | 1.30 |
| 38 | <u>38</u> | <u>16</u> | 16 | 0.06 | 0.32 | 1.45 | 0.003 | 0.0006 | 2.45 | <u>0.10</u> | 1.13 |
| 39 | 39 | 17 | 17 | 0.06 | 1.00 | 1.43 | 0.002 | 0.0006 | 2.45 | 1.50 | 0.55 |
| 40 | 40 | 18 | 18 | 0.05 | 0.24 | 1.52 | 0.004 | 0.0006 | 2.35 | 1.50 | 1.03 |
| 41 | 41 | 19 | 19 | 0.06 | 0.25 | 2.20 | 0.010 | 0.0003 | 2.12 | 1.15 | 1.30 |
| 42 | 42 | 20 | 20 | 0.10 | 0.25 | 1.45 | 0.003 | 0.0005 | 2.10 | 0.96 | 0.96 |
| 43 | 43 | <u>21</u> | 21 | <u>0.20</u> | 0.18 | 2.20 | 0.005 | 0.0010 | 2.30 | 0.96 | 1.05 |
| 44 | 44 | <u>22</u> | 22 | 0.12 | 0.15 | 1.75 | 0.007 | 0.0002 | 2.20 | <u>3.50</u> | 0.89 |

A figure "0" in the table means that the content of the relevant component is smaller than the detectable limit.
An underlined figure means that the figure is outside the range stipulated in the item (6) of the present invention.
$C_{eq} = C + Mn/6 + (Ni + Cu)/15 + (Cr + Mo + V)/5$
$P_{cm} = C + Si/30 + (Mn + Cr + Cu)/20 + Ni/60 + Mo/15 + V/5 + 5B$
C, Si, Mn, Cr, Cu, Ni, Mo, V and B represent the respective contents (mass %) thereof.
$C_{eq}$ and $P_{cm}$ are calculated on the premise that the contents of Cu and elements under detectable limits are zero.

TABLE 10

(continued from Table 9)

| Production No. | Weld metal No. | Steel No. | Wire No. | Chemical component of weld metal (mass %) | | | | | | $C_{eq}$ | $P_{cm}$ |
|---|---|---|---|---|---|---|---|---|---|---|---|
| | | | | Nb | V | Ti | Al | B | Cr + Mo + V | | |
| 23 | 23 | 1 | 1 | 0.010 | 0.035 | 0.020 | 0.010 | 0.0003 | 2.40 | 0.966 | 0.331 |
| 24 | 24 | 2 | 2 | 0.030 | 0.060 | 0.018 | 0.008 | 0.0005 | 2.41 | 0.918 | 0.319 |
| 25 | 25 | 3 | 3 | 0.012 | 0.040 | 0.025 | 0.005 | 0.0003 | 2.24 | 0.928 | 0.345 |
| 26 | 26 | 4 | 4 | 0.020 | 0.050 | 0.026 | 0.004 | 0.0006 | 2.30 | 0.973 | 0.338 |
| 27 | 27 | 5 | 5 | 0.025 | 0.060 | 0.021 | 0.006 | 0.0010 | 2.28 | 0.916 | 0.328 |
| 28 | 28 | 6 | 6 | 0.012 | 0.040 | 0.026 | 0.003 | 0.0006 | 2.26 | 0.964 | 0.383 |
| 29 | 29 | 7 | 7 | 0.015 | 0.060 | 0.021 | 0.008 | 0.0015 | 2.01 | 0.959 | 0.323 |
| 30 | 30 | 8 | 8 | 0.006 | 0.030 | 0.026 | 0.001 | 0.0006 | 2.48 | 1.003 | 0.360 |
| 31 | 31 | 9 | 9 | 0.008 | 0.050 | 0.030 | 0.003 | 0.0008 | 2.35 | 0.975 | 0.346 |
| 32 | 32 | 10 | 10 | 0.003 | 0.070 | 0.035 | 0.012 | 0 | 2.35 | 1.107 | 0.375 |
| 33 | 33 | 11 | 11 | 0.015 | 0.060 | 0.024 | 0.001 | 0.0026 | 2.41 | 0.905 | 0.339 |
| 34 | 34 | 12 | 12 | 0.009 | 0.060 | 0.004 | 0.005 | 0 | 2.32 | 0.937 | 0.330 |
| 35 | 35 | 13 | 13 | 0.020 | 0.050 | 0.045 | 0.006 | 0.0025 | 2.41 | 0.944 | 0.358 |
| 36 | 36 | 14 | 14 | 0.015 | 0.020 | 0.025 | 0.007 | 0.0045 | 2.35 | 0.932 | 0.341 |
| 37 | <u>37</u> | <u>15</u> | <u>15</u> | 0.022 | 0.030 | 0.026 | 0.003 | 0.0010 | 2.80 | 0.979 | 0.318 |
| 38 | <u>38</u> | <u>16</u> | <u>16</u> | 0.031 | 0.010 | 0.023 | 0.002 | 0 | 1.23 | 0.711 | 0.248 |
| 39 | <u>39</u> | <u>17</u> | <u>17</u> | 0.006 | 0.040 | 0.015 | 0.005 | 0.0019 | 1.59 | 0.780 | 0.347 |
| 40 | <u>40</u> | <u>18</u> | <u>18</u> | 0.013 | 0.030 | 0.020 | 0.006 | 0.0003 | 2.53 | 0.966 | 0.329 |
| 41 | <u>41</u> | <u>19</u> | <u>19</u> | 0.021 | 0.020 | 0.025 | 0.003 | 0.0010 | 2.45 | 1.059 | 0.362 |
| 42 | <u>42</u> | <u>20</u> | <u>20</u> | 0.012 | 0.050 | 0.035 | 0.015 | 0 | 1.97 | 0.876 | 0.333 |
| 43 | 43 | <u>21</u> | <u>21</u> | 0.030 | 0.050 | 0.016 | 0.012 | 0.0026 | 2.06 | 1.132 | 0.489 |
| 44 | 44 | <u>22</u> | <u>22</u> | 0.013 | 0.030 | 0.018 | 0.020 | 0.0005 | 4.42 | 1.442 | 0.533 |

A figure "0" in the table means that the content of the relevant component is smaller than the detectable limit.
An underlined figure means that the figure is outside the range stipulated in the item (6) of the present invention.
$C_{eq}$ = C + Mn/6 + (Ni + Cu)/15 + (Cr + Mo + V)/5
$P_{cm}$ = C + Si/30 + (Mn + Cr + Cu)/20 + Ni/60 + Mo/15 + V/5 + 5B
C, Si, Mn, Cr, Cu, Ni, Mo, V and B represent the respective contents (mass %) thereof.
$C_{eq}$ and $P_{cm}$ are calculated on the premise that the contents of Cu and elements under detectable limits are zero.

TABLE 11

| | | | | | Hydrogen amount and precipitate analysis result in inner side weld metal | | | | | | | |
|---|---|---|---|---|---|---|---|---|---|---|---|---|
| Prod. No. | Weld metal No. | Steel No. | β | P | Non-diffusible hydrogen amount ppm | Total hydrogen amount ppm | Ratio of non-diffusible hydrogen amount to total hydrogen amount % | Mo carbides pieces/μm² | TS MPa | $vE_{-20}$ J | $\alpha_{BM}$ % | Cold cracking |
| 23 | 23 | 1 | 0 | 4.12 | 0.3 | 2.0 | 15 | 5.0 | 1,056 | 95 | 93 | None |
| 24 | 24 | 2 | 1 | 2.41 | 0.2 | 7.0 | 2.9 | 10.0 | 1,037 | 102 | 93 | None |
| 25 | 25 | 3 | 1 | 3.45 | 0.5 | 5.0 | 10 | 8.0 | 995 | 131 | 94 | None |
| 26 | 26 | 4 | 1 | 2.47 | 0.3 | 4.0 | 7.5 | 20.0 | 958 | 121 | 95 | None |
| 27 | 27 | 5 | 1 | 3.22 | 0.2 | 6.0 | 3.3 | 6.0 | 1,018 | 96 | 94 | None |
| 28 | 28 | 6 | 1 | 2.34 | 0.4 | 4.0 | 10 | 7.0 | 1,012 | 101 | 96 | None |
| 29 | 29 | 7 | 1 | 3.55 | 0.2 | 6.0 | 3.3 | 10.0 | 1,031 | 130 | 94 | None |
| 30 | 30 | 8 | 1 | 1.90 | 0.3 | 3.0 | 10 | 9.0 | 1,018 | 141 | 92 | None |
| 31 | 31 | 9 | 0 | 3.19 | 0.6 | 2.0 | 30 | 11.0 | 1,066 | 89 | 96 | None |
| 32 | 32 | 10 | 0 | 2.57 | 0.3 | 5.0 | 6.0 | 1.5 | 939 | 132 | 94 | None |
| 33 | 33 | 11 | 1 | 2.82 | 0.2 | 7.0 | 2.9 | 2.3 | 1,084 | 90 | 94 | None |
| 34 | 34 | 12 | 0 | 2.34 | 0.3 | 3.0 | 10 | 3.5 | 1,044 | 102 | 96 | None |
| 35 | 35 | 13 | 1 | 3.60 | 0.1 | 1.0 | 10 | 1.0 | 1,074 | 86 | 97 | None |
| 36 | 36 | 14 | 1 | 2.54 | 0.2 | 5.0 | 4.0 | 4.0 | 930 | 152 | 95 | None |
| <u>37</u> | <u>37</u> | <u>15</u> | 1 | 3.33 | <u>0</u> | 8.0 | 0 | <u>0.3</u> | 935 | 180 | 96 | Present |
| <u>38</u> | <u>38</u> | <u>16</u> | 1 | 2.39 | <u>0</u> | 7.0 | 0 | <u>0.5</u> | 940 | 130 | 97 | Present |
| <u>39</u> | 39 | <u>17</u> | 1 | 3.16 | <u>0</u> | 6.0 | 0 | <u>0.4</u> | 945 | 160 | 95 | Present |
| <u>40</u> | 40 | <u>18</u> | 1 | 2.37 | <u>0</u> | 4.0 | 0 | <u>0.3</u> | 950 | 90 | 94 | Present |
| <u>41</u> | 41 | <u>19</u> | 1 | 3.72 | <u>0</u> | 3.0 | 0 | <u>0.4</u> | 955 | 150 | 96 | Present |
| <u>42</u> | 42 | <u>20</u> | 1 | 2.96 | <u>0</u> | 5.0 | 0 | <u>0.3</u> | 970 | 130 | 95 | Present |
| <u>43</u> | <u>43</u> | <u>21</u> | 1 | 3.36 | 0.2 | 7.0 | 2.9 | 3.2 | 1,205 | 50 | 94 | None |
| <u>44</u> | 44 | <u>22</u> | 1 | 4.39 | 0.3 | 9.0 | 3.3 | 5.6 | 1,148 | 49 | 93 | None |

An underlined figure means that the figure is outside the range stipulated in the item (6) of the present invention.
β = 1 when B is 3 ppm or more, and β = 0 when B is less than 3 ppm.
P = 2.7C + 0.4Si + Mn + 0.8Cr + 0.45(Ni + Cu) + (1 + β)Mo − 1 + β
C, Si, Mn, Cr, Cu, Ni and Mo represent the respective contents (mass %) thereof.
Calculation was performed on the premise that the contents of Cu and elements under detectable limits are zero.

The invention claimed is:

1. A method for producing a welded joint excellent in cold cracking resistance of a weld metal, characterized by:

(i) shaping a steel plate into a pipe, wherein said steel plate contains, in mass,
C: 0.03 to 0.10%
Si: 0.6% or less,
Mn: 1.7 to 2.5%,
P: 0.015% or less,
S: 0.003% or less,
Ni: 0.1 to 1.0%,
Mo: 0.15 to 0.60%,
Nb: 0.001 to 0.10%, and
Ti: 0.005 to 0.030%,
and optionally one or more of
Cr: 0.8% or less,
V: 0.10% or less,
Al: 0.06% or less,
B: 0.005% or less,
N: 0.001 to 0.006%,
Cu: 1.0% or less,
Ca: 0.01% or less,
REM: 0.02% or less, and
Mg: 0.006% or less,
with the balance being Fe and unavoidable impurities;

(ii) welding said steel plate from the inner side by using a welding wire containing, in mass,
C: 0.01 to 0.12%,
Si: 0.3% or less,
Mn: 1.2 to 2.4%,
Ni: 4.0 to 8.5%,
Mo: 0.5 to 3.0%,
Cr: 0.5 to 3.0%,
V: 0.01 to 0.5%,
Ti: 0.005 to 0.2%, and
Al: 0.02% or less,
with the balance being Fe and unavoidable impurities; and (iii) thereafter welding said steel plate from the outer side by using said welding wire, wherein said welding from said outer side is carried out in a manner so that a reheating temperature of the inner side weld metal reaches within the range from 500° C. to 700° C.

2. A method for producing a welded joint excellent in cold cracking resistance of a weld metal according to claim 1, characterized by performing said welding of said inner side and said welding of said outer side by submerged arc welding by using said welding wire, and an agglomerated-type or fused-type flux; and thereafter pipe expansion.

* * * * *